US012631901B2

(12) United States Patent
Adema

(10) Patent No.: US 12,631,901 B2
(45) Date of Patent: May 19, 2026

(54) TORQUE CONTROL MECHANISM FOR FRAME OF HEAD MOUNTED WEARABLE DEVICE

(71) Applicant: Google LLC, Mountain View, CA (US)

(72) Inventor: Daniel Adema, Kitchener (CA)

(73) Assignee: Google LLC, Mountain View, CA (US)

( * ) Notice: Subject to any disclaimer, the term of this patent is extended or adjusted under 35 U.S.C. 154(b) by 433 days.

(21) Appl. No.: 18/192,904

(22) Filed: Mar. 30, 2023

(65) Prior Publication Data

US 2023/0324715 A1      Oct. 12, 2023

Related U.S. Application Data

(60) Provisional application No. 63/362,416, filed on Apr. 4, 2022.

(51) Int. Cl.
*G02C 5/22* (2006.01)
*G02B 27/01* (2006.01)

(52) U.S. Cl.
CPC ......... *G02C 5/2254* (2013.01); *G02C 5/2209* (2013.01); *G02B 2027/0178* (2013.01); *G02C 2200/02* (2013.01)

(58) Field of Classification Search
CPC ............... G02C 5/2254; G02C 5/2209; G02C 2200/02; G02B 2027/0178
USPC ........... 351/153; 16/228, 277, 303, 320, 341
See application file for complete search history.

(56) References Cited

U.S. PATENT DOCUMENTS

| | | | | |
|---|---|---|---|---|
| 11,340,463 B1 * | 5/2022 | Bobuk | ................. | G02C 5/2209 |
| 2010/0328273 A1 * | 12/2010 | Tom | ...................... | G06F 1/1647 |
| | | | | 345/184 |
| 2011/0010893 A1 * | 1/2011 | Su | ......................... | H01F 7/0231 |
| | | | | 16/382 |
| 2014/0208543 A1 * | 7/2014 | Fullerton | ................. | G09F 7/04 |
| | | | | 16/273 |

* cited by examiner

*Primary Examiner* — George G. King

(74) *Attorney, Agent, or Firm* — Brake Hughes Bellermann LLP

(57) ABSTRACT

Systems and methods for controlling an amount of torque transmitted from the temple arm portions to a front frame portion of a frame of a head mounted wearable device are provided. Hinge mechanisms that rotatably couple the temple arm portions to the front frame portion may include torque control devices that provide for torque control in response to rotation and/or deflection of the temple arm portions, to control an amount of torque that is transmitted to the front frame portion. A magnetic torque control device may include first and second arrays of magnets arranged within the hinge mechanism, and that are selectively engaged and disengaged to provide compliance in multiple axes. An elastomer torque control device may include an engagement pin that selectively engages and disengages recesses in an elastomer layer provided within the hinge mechanism to provide compliance in multiple axes.

18 Claims, 21 Drawing Sheets

TORQUE CONTROL MECHANISM FOR FRAME OF HEAD MOUNTED WEARABLE DEVICE

CROSS-REFERENCE TO RELATED APPLICATION

This application claims priority to U.S. Provisional Patent Application No. 63/362,416 filed on Apr. 4, 2022, entitled "TORQUE CONTROL MECHANISM FOR FRAME OF HEAD MOUNTED WEARABLE DEVICE," the disclosure of which is incorporated herein in its entirety.

TECHNICAL FIELD

This description relates in general to head mounted wearable devices, and in particular, to head mounted wearable computing devices including a display device.

BACKGROUND

Eyewear in the form of glasses may be worn by a user to, for example, provide for vision correction, reduce the effect of sunlight and/or glare, provide a measure of safety, and the like. These types of eyewear are typically somewhat flexible and/or deformable, so that the eyewear can be manipulated to comfortably fit the user. In some situations, an ophthalmic technician may manipulate rim portions and/or temple arm portions of a frame of the eyewear, for example, through cold working the frame and/or heating and re-working the frame, to adjust the eyewear to meet the needs of a particular user. In some situations, this re-working of the frame may occur over time, through continued use/wearing of the eyewear by the user. Manipulation in this manner, due to the flexible and/or deformable nature of the material of the frame and/or the lenses of the eyewear, may provide a comfortable fit while still maintaining ophthalmic alignment between the eyewear and the user. In a situation in which the eyewear is a head mounted computing device including a display, such as, for example, smart glasses, this type of flexibility and/or deformation in the frame may cause inconsistent alignment of the display, or misalignment of the display. Inconsistent alignment, or mis-alignment of the display can result in inconsistent alignment, or mis-alignment of content output by the display, relative to an eye box, or field of view of the user. This may cause visual discomfort, particularly in the case of a binocular display. A frame having rigid, non-flexible components, while still providing some level of flexibility in certain portions of the frame to allow for some level of adjustment of fit, may maintain alignment of the display, and may be effective in housing electronic components of a head mounted computing device including a display.

SUMMARY

In one general aspect, a head mounted wearable device includes a frame, including a front frame portion; an arm portion coupled to the front frame portion; and a hinge mechanism rotatably coupling the arm portion to the front frame portion. The hinge mechanism includes a torque control device that is configured to control a level of torque transmitted to the front frame portion in response to a force applied to the arm portion or a deflection of the arm portion. In some implementations, the torque control device is positioned in a space formed between a first cylindrical wall and a second cylindrical wall of the hinge mechanism, and is configured to be selectively engaged in response to relative rotation of the first cylindrical wall and the second cylindrical wall of the hinge mechanism. The torque control device may include a first array of magnets arranged on a surface of the first cylindrical wall; and a second array of magnets arranged on a surface of the second cylindrical wall facing the surface of the first cylindrical wall.

In some implementations, the first array of magnets and the second array of magnets are configured to be selectively engaged and disengaged in response to rotation of the first cylindrical wall relative to the second cylindrical wall.

In some implementations, the first array of magnets and the second array of magnets are configured to be disengaged in response to rotation of the first cylindrical wall relative to the second cylindrical wall that produces a torque level that is greater than a threshold torque level.

In some implementations, the second cylindrical wall surrounds the first cylindrical wall, and the first cylindrical wall and the second cylindrical wall are concentrically arranged.

In some implementations, the first array of magnets is arranged on an outer circumferential surface of the first cylindrical wall, and the second array of magnets is arranged on an inner circumferential surface of the second cylindrical wall.

In some implementations, the first array of magnets includes a first plurality of magnets arranged on an outer circumferential surface of the first cylindrical wall, the first plurality of magnets having a first polarity; and the second array of magnets includes a second plurality of magnets arranged on an inner circumferential surface of the second cylindrical wall, some of the second plurality of magnets having the first polarity, and some of the second plurality of magnets having a second polarity.

In some implementations, the second plurality of magnets are arranged on the inner circumferential surface of the second cylindrical wall, alternating between the first polarity and the second polarity.

In some implementations, the torque control device is positioned within an outer wall of the hinge mechanism, the torque control device including an elastomer layer on an inner surface of the outer wall of the hinge mechanism; at least one recess formed in the elastomer layer; and an engagement pin coupled to a central pin of the hinge mechanism and configured to rotate together with the central pin in response to rotation of the arm portion relative to the front frame portion. At least one end portion of the engagement pin may be configured to selectively engage the at least one recess formed in the elastomer layer in response to rotation of the engagement pin.

In some implementations, the at least one end portion is configured to be engaged in the at least one recess of the elastomer layer, and to be released from the at least one recess in response to rotation of the arm portion relative to the front frame portion that produces a torque level that is greater than a threshold torque level.

In some implementations, the engagement pin surrounds the central pin of the hinge mechanism, and the outer wall of the hinge mechanism surrounds the central pin, the engagement pin, and the elastomer layer, such that the central pin, the engagement pin, and the outer wall are concentrically arranged.

In some implementations, the central pin has a substantially circular cross section, and the engagement pin has a substantially ovoid cross section surrounding the central pin.

In some implementations, the at least one end portion of the engagement pin includes a first end portion at a first ovoid end of the engagement pin, and a second and portion at a second ovoid end of the engagement pin.

In some implementations, the elastomer layer includes a first section defining a first recess; and a second section defining a second recess, with a first gap in the elastomer layer formed between a first end portion of the first section and a first end portion of the second section, and a second gap in the elastomer layer formed between a second end portion of the first section and a second end portion of the second section.

In some implementations, at least one of the first end portion or the second end portion of the engagement pin is configured to be engaged in at least one of the first recess or the second recess of the elastomer layer, and to be released from the at least one of the first recess or the second recess to be positioned in at least one of the first gap or the second gap in the elastomer layer in response to rotation of the arm portion relative to the front frame portion that produces a torque level that is greater than a threshold torque level.

In another general aspect, a hinge mechanism including a torque control device includes a first cylindrical wall; a second cylindrical wall surrounding the first cylindrical wall and concentrically arranged with the first cylindrical wall; a first array of magnets arranged on an outer circumferential surface of the first cylindrical wall; and a second array of magnets arranged on an inner circumferential surface of the second cylindrical wall, facing the first array of magnets. The first array of magnets and the second array of magnets may be configured to be engaged in an at rest state of the hinge mechanism, and to be disengaged in response to rotation of the first cylindrical wall relative to the second cylindrical wall that produces a torque level at the hinge mechanism that is greater than a threshold torque level.

In some implementations, the first array of magnets includes a first plurality of magnets having a first polarity; and the second array of magnets includes a second plurality of magnets, some of the second plurality of magnets having the first polarity, and some of the second plurality of magnets having a second polarity, wherein the second plurality of magnets are arranged on the inner circumferential surface of the second cylindrical wall, alternating between the first polarity and the second polarity.

In another general aspect, a hinge mechanism including a torque control device includes a central pin; a cylindrical outer wall surrounding the central pin, and concentrically arranged with the central pin; an elastomer layer on an inner circumferential surface of the cylindrical outer wall; at least one recess formed in the elastomer layer; at least one gap area formed in the elastomer layer; and an engagement pin coupled to the central pin so as to rotate together with the central pin. At least one end portion of the engagement pin may be configured to selectively engage the at least one recess formed in the elastomer layer in response to rotation of the engagement pin, and to be released from the at least one recess in response to rotation of the hinge mechanism that produces a torque level in the hinge mechanism that is greater than a threshold torque level.

In some implementations, the central pin has a substantially circular cross section, and the engagement pin has a substantially ovoid cross section surrounding the central pin, and the at least one end portion of the engagement pin includes a first end portion at a first ovoid end of the engagement pin, and a second and portion at a second ovoid end of the engagement pin.

In some implementations, the first end portion of the engagement pin is configured to be engaged in a first recess formed in the elastomer layer, and the second end portion of the engagement pin is configured to be engaged in a second recess formed in the elastomer layer in an at rest state, and the first end portion of the engagement pin is configured to be released from the first recess and positioned in a gap area of the elastomer layer, and the second end portion of the engagement pin is configured to be released from the second recess and positioned in a gap area of the elastomer layer in response to a force applied to the hinge mechanism that produces a torque level that is greater than the threshold torque level.

The details of one or more implementations are set forth in the accompanying drawings and the description below. Other features will be apparent from the description and drawings, and from the claims.

DETAILED DESCRIPTION

Figure 1A:
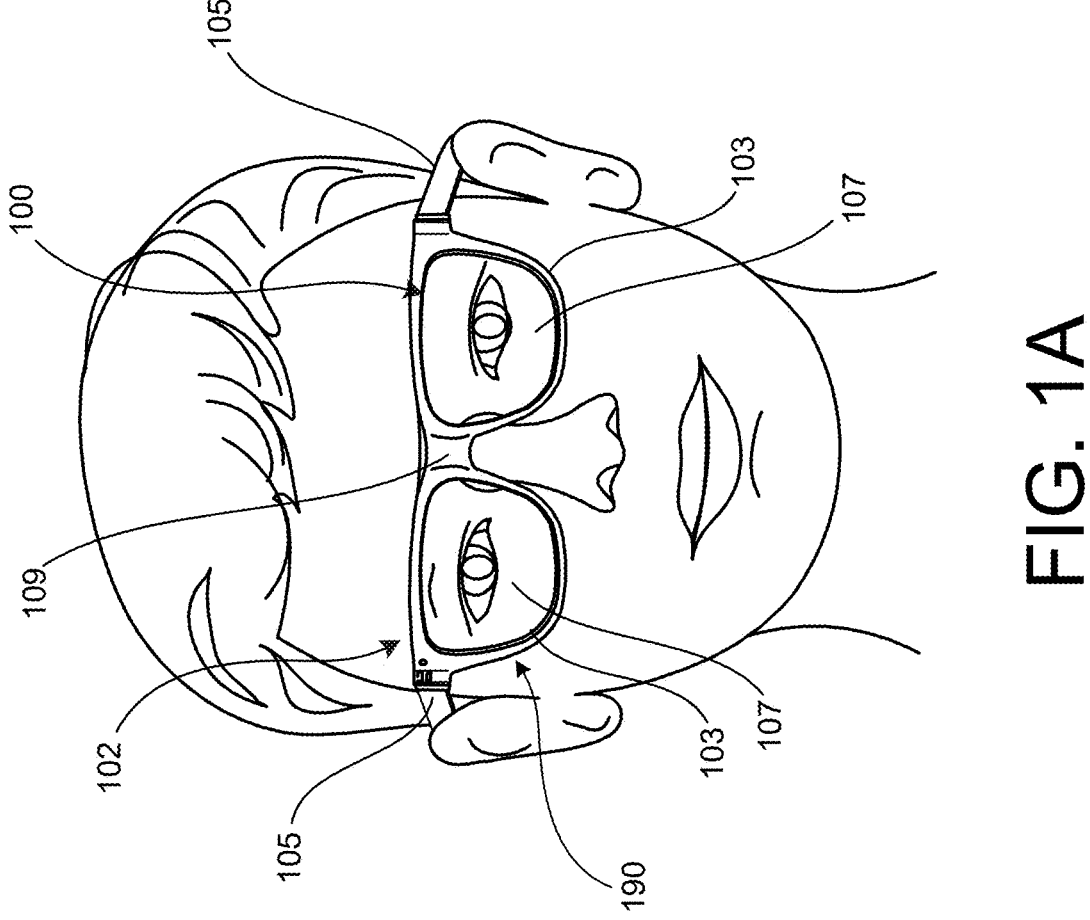
FIG. 1A illustrates an example system, in accordance with implementations described herein.

This disclosure relates to mechanisms for eyewear, and in particular, for eyewear including display capability and/or computing/processing capability, that allow for flexibility in some portions of the eyewear, while maintaining rigidity in other portions of the eyewear. Rigidity in some portions of the eyewear, such as, for example, a front frame portion of a frame of the eyewear, may maintain display alignment to, in turn, maintain integrity of content output by a display device of the eyewear, and maintain visual comfort for the user. That is, rigidity in the front frame portion of the eyewear may maintain alignment of content output by the display within a field of view of the user, and within an eye box coincident with one or both lenses of the eyewear. In some examples, torque control mechanisms, in accordance with implementations described herein, can absorb and/or redirect torque applied to the frame, for example, due to deflection of one or both temple arm portions of the frame, so that rigidity of the front frame portion of the frame can be maintained.

Eyewear, or glasses, are typically somewhat flexible and/or deformable, so that the eyewear can be manipulated to adapt to a particular head size and/or shape, a particular arrangement of features, a preferred pose of the eyewear on the face, a position of the eyewear on the nose, and the like, associated with a user, to provide a comfortable fit for the user. The flexible or deformable characteristics of the material of the frame of the eyewear may allow the eyewear to be customized (i.e., by a user and/or by a technician) to fit a particular user, while still maintaining the functionality of the eyewear. Similarly, the flexible or deformable characteristics of the material of the frame of the eyewear may allow the eyewear to maintain its functionality over time. For example, deformation (bending, flexing, twisting and the like) over time due to wear, use and the like may cause permanent deformation of the frame that, in many instances, will not affect the functionality of the eyewear.

The ability to flex, or deform and maintain functionality as described above may be designed into traditional ophthalmic eyewear, such that deformation and/or flex and/or twist in the frame does not adversely affect functionality of the eyewear such as, for example, vision correction. In a situation in which the eyewear is in the form of smart glasses that include a display device, as well as other electronic components (for example, to support computing/processing capability), flex or deformation of the frame may not provide the desired structural support for electronic components coupled to and/or housed in the frame. Similarly, flex or deformation of the frame of a pair of smart glasses may not provide for and/or maintain the alignment of the display with an eye box and/or output coupler that would otherwise ensure that content output by the display is visible by the user, resulting in visual discomfort.

Figure 1B:
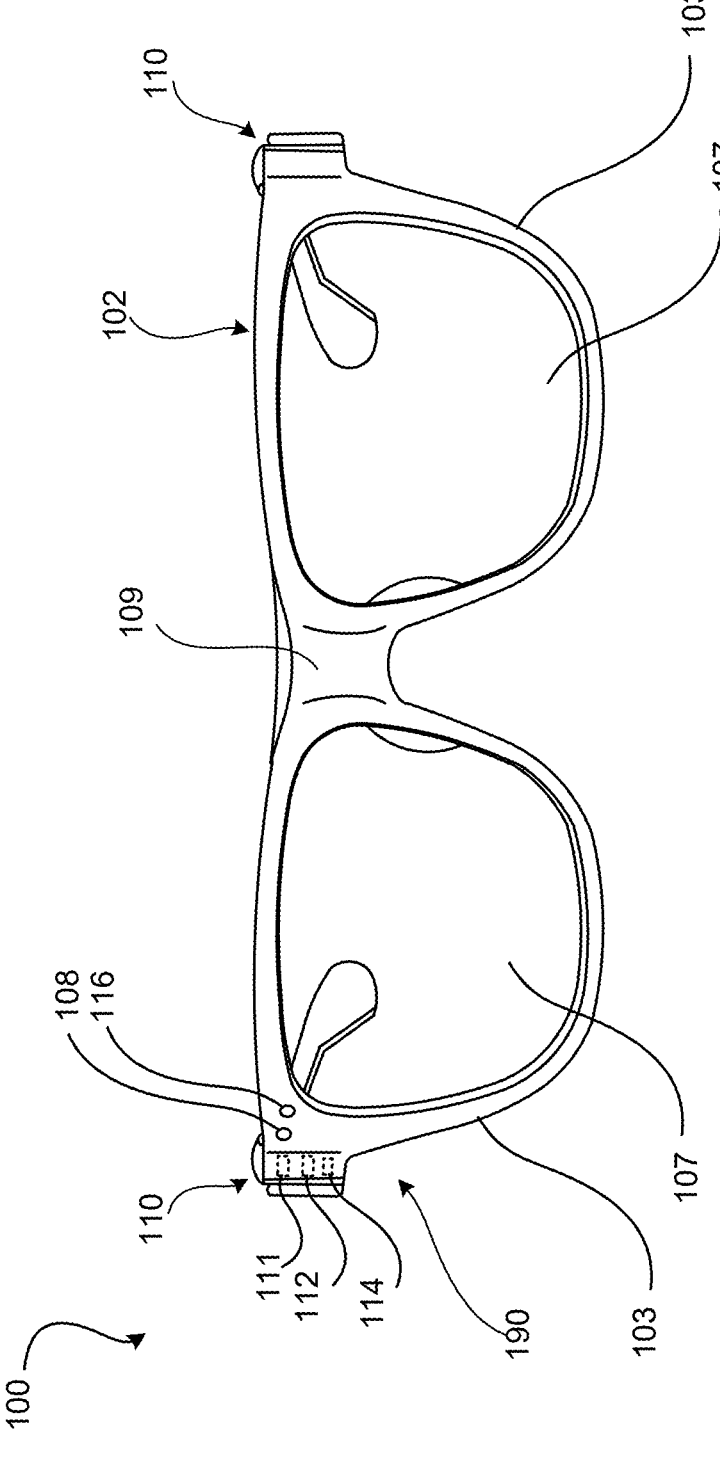
FIG. 1B is a front view.

FIG. 1A illustrates a user wearing an example head mounted wearable device 100. The example head mounted wearable device 100 shown in FIG. 1A is in the form of smart glasses, or augmented reality glasses, including display capability and computing/processing capability, for purposes of discussion and illustration. The principles to be described herein may be applied to other types of eyewear, both with and without display capability and/or computing/processing capability. FIG. 1B is a front view, and FIG. 1C is a rear view, of the example head mounted wearable device 100 shown in FIG. 1A.

Figure 1C:
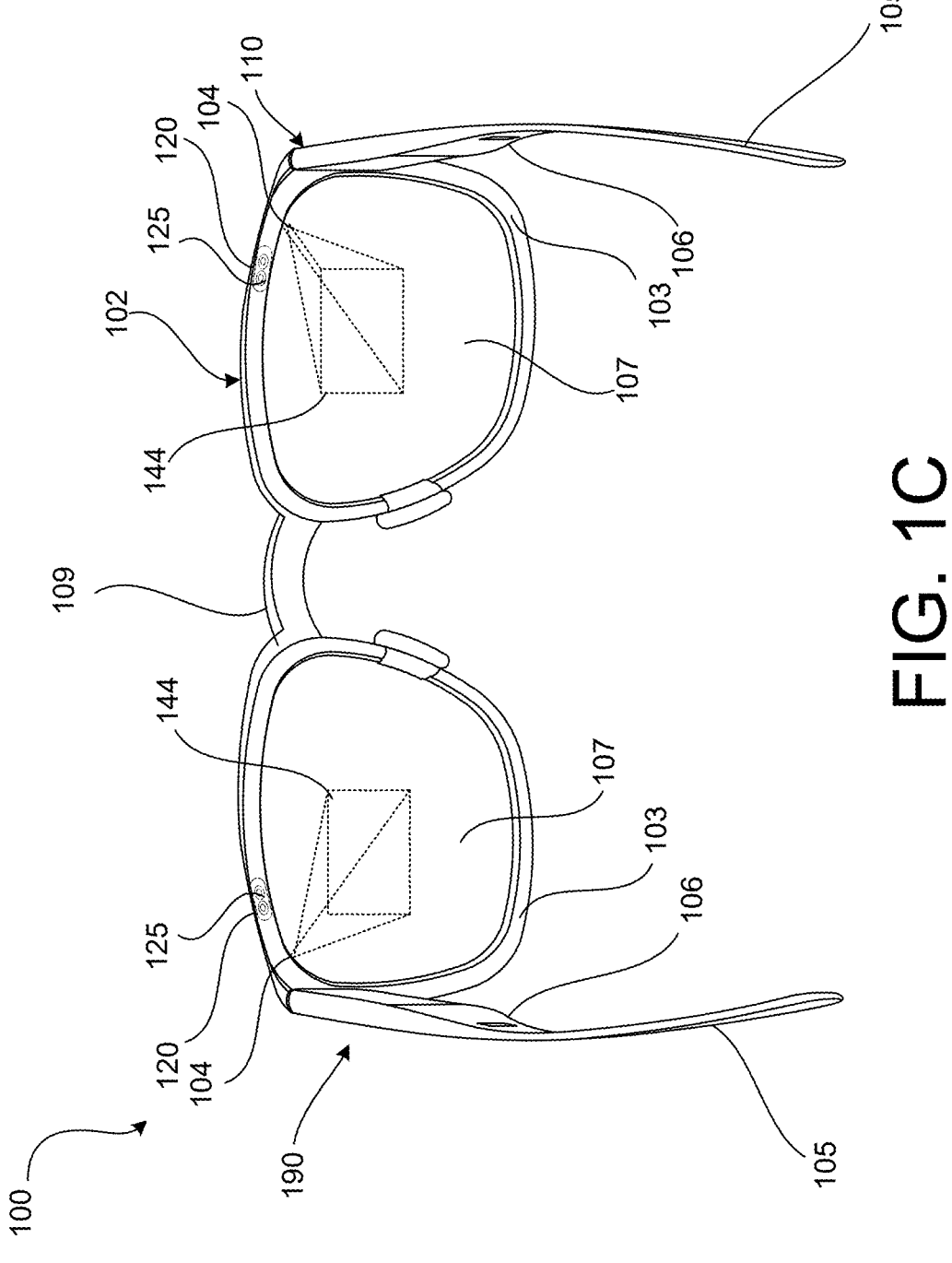
FIG. 1C is a rear view, of an example head mounted wearable device shown in FIG. 1A, in accordance with implementations described herein.

As shown in FIGS. 1A-1C, the example head mounted wearable device 100 includes a frame 190. The frame 190 includes a front frame portion 102 defined by rim portions 103 surrounding respective optical portions in the form of lenses 107, with a bridge portion 109 connecting the rim portions 103. Arm portions 105 are coupled, for example, pivotably or rotatably coupled, to the front frame portion 102 by hinge portions 110 at the respective rim portion 103. In some examples, the lenses 107 may be corrective/prescription lenses. In some examples, the lenses 107 may be an optical material including glass and/or plastic portions that do not necessarily incorporate corrective/prescription parameters.

In some examples, a display device 104 may be coupled in a portion of the frame 190 to output content for viewing by the user at one or both of the lens(es) 107. An eye box may extend toward one or both of the lens(es) 107, for output of content at an output coupler 144 at which content output by the display device 104 may be visible to the user. In some examples, the output coupler 144 may be substantially coincident with the lens(es) 107. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

In some examples, the head mounted wearable device 100 may include at least one gaze tracking device 120. The at least one gaze tracking device 120 may include one or more sensors 125, to detect and track eye gaze direction and movement. Data captured by the sensor(s) 125 may be processed to detect and track gaze direction and movement as a user input. In some examples, multiple gaze tracking devices 120 may track gaze direction and movement of both eyes of the user.

In some examples, the head mounted wearable device 100 can also include an audio output device 106 (such as, for example, one or more speakers), an illumination device 108, a sensing system 111, a control system 112, at least one processor 114, and an outward facing image sensor 116, or camera. In some examples, the sensing system 111 may include various sensing devices and the control system 112 may include various control system devices including, for example, one or more processors 114 operably coupled to the components of the control system 112. In some examples, the control system 112 may include a communication module providing for communication and exchange of information between the head mounted wearable device 100 and other external devices.

As noted above, at least some portions of the frame 190 may be made of rigid materials and/or components, to maintain alignment of content output by the display device(s) 104 and/or to accommodate the electronic components included in and/or coupled to the frame 190. However, in some examples, the frame 190 may be designed to provide some amount of flexure in certain portions of the frame 190, to allow the frame 190 to be comfortably worn by a variety of users. Some degree of flexure in certain portions of the frame 190 may allow the head mounted wearable device 100 (in the form of smart glasses as shown in this example) to also include the functionality of traditional ophthalmic eyewear. Including the functionality of traditional ophthalmic eyewear (in a head mounted wearable device 100 in the form of smart glasses) requires that the frame 190 meet established standards for flexure in ophthalmic eyewear, while also providing the rigidity in remaining portions of the frame 190 necessary to maintain alignment of the display device(s) 104 and/or support for the electronic components. In order to include the functionality of traditional ophthalmic eyewear, the frame 190 may be held to similar standards for durability to that of traditional ophthalmic eyewear, including response to deformation due to repeated flexure over time.

Figure 2:
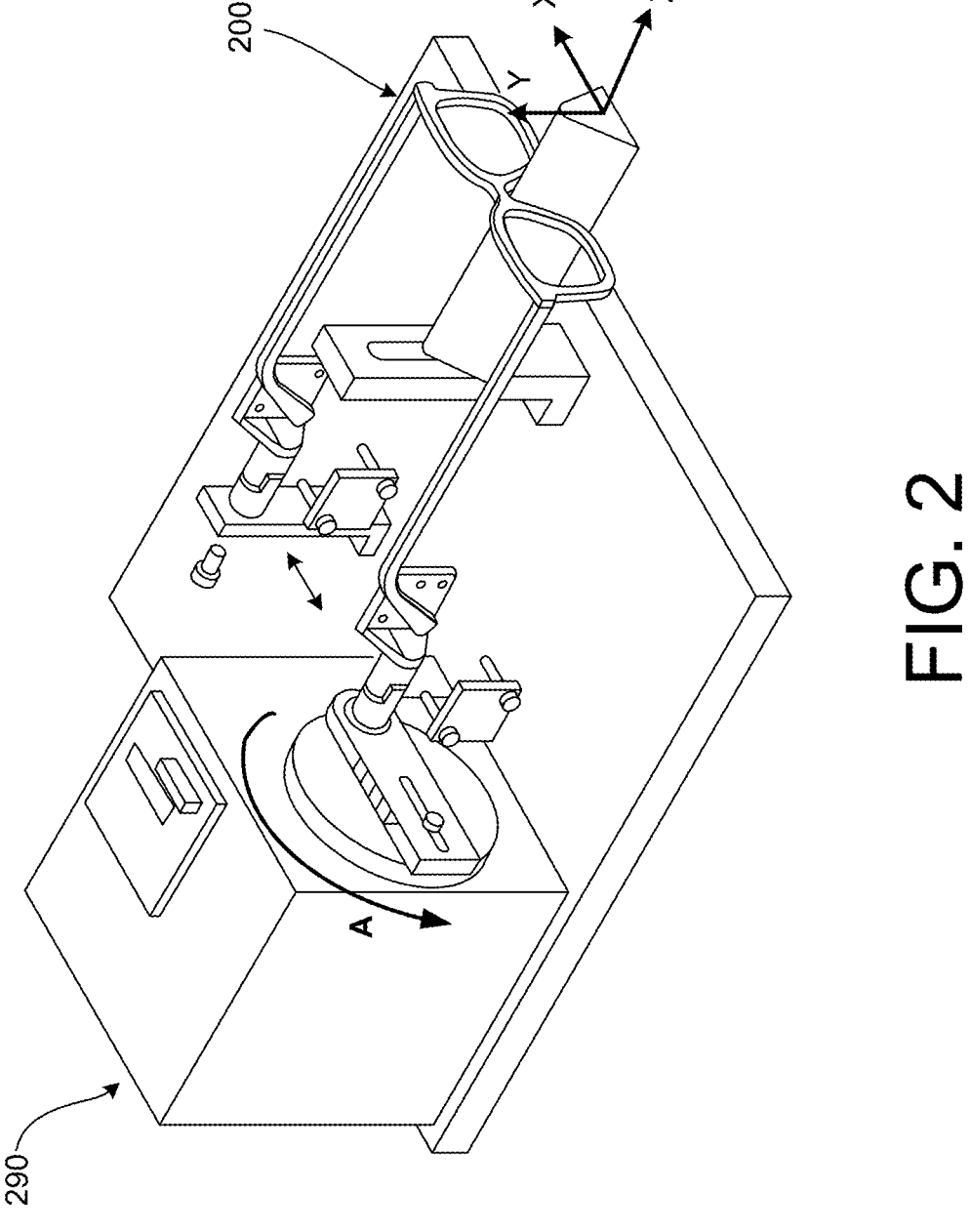
FIG. 2 illustrates an example system for durability testing of eyewear.

FIG. 2 illustrates an example system 290 for assessing the durability of a frame over time, through repeated cycles of deformation. The repeated cycles of deformation may include, for example, twisting motion, flexing motion, bending motion, pivoting motion and the like. If the frame 190 of the example head mounted wearable device 100 in the form of smart glasses is to also include the functionality of traditional ophthalmic eyewear, then the frame 190 will be expected to meet similar standards, while still providing the rigidity needed to maintain display alignment and/or structural support for the electronic components.

Figure 3A:
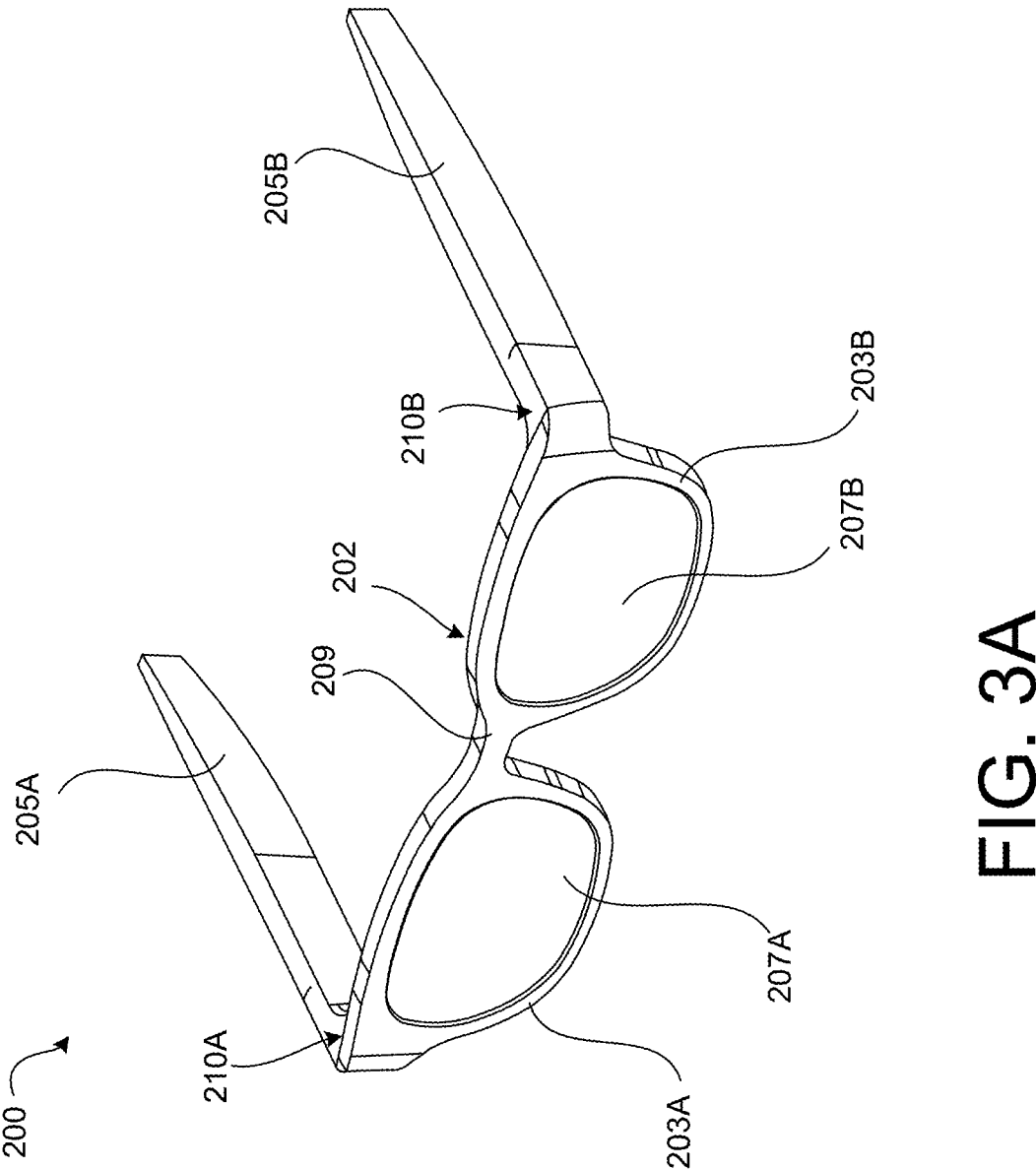
FIG. 3A is a schematic perspective view.
Figure 3B:
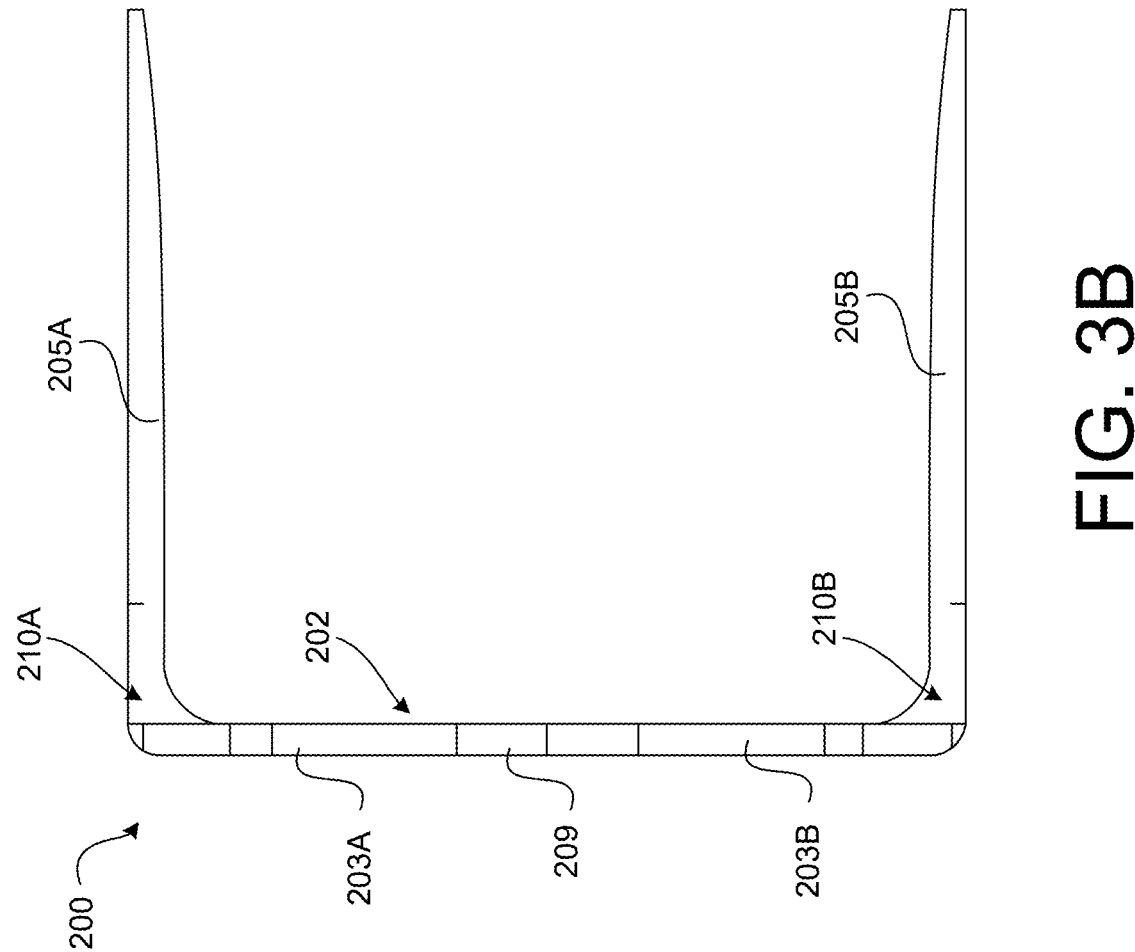
FIG. 3B is a schematic top view.
Figure 3C:
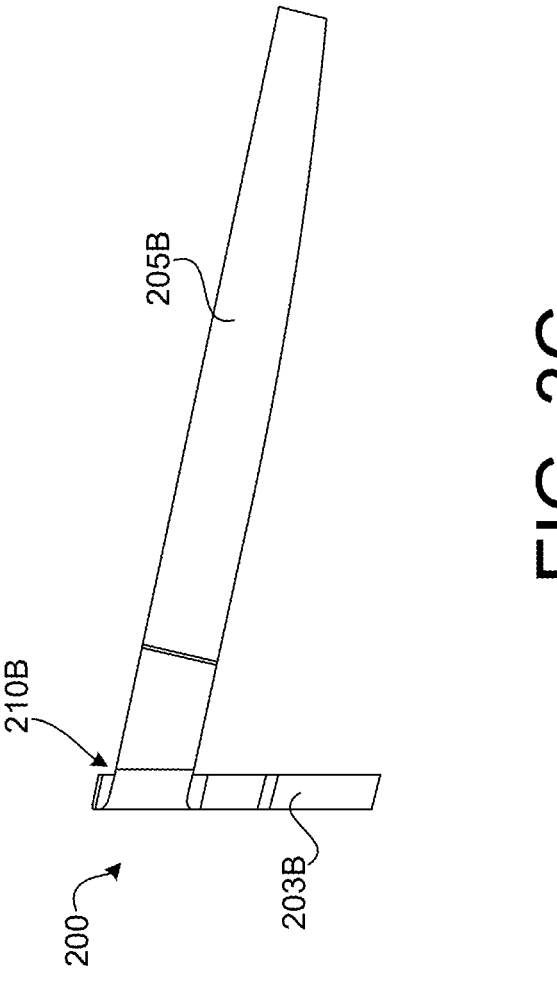
FIG. 3C is a schematic side view, of a sample head mounted wearable device in an at rest state.
Figure 4A:
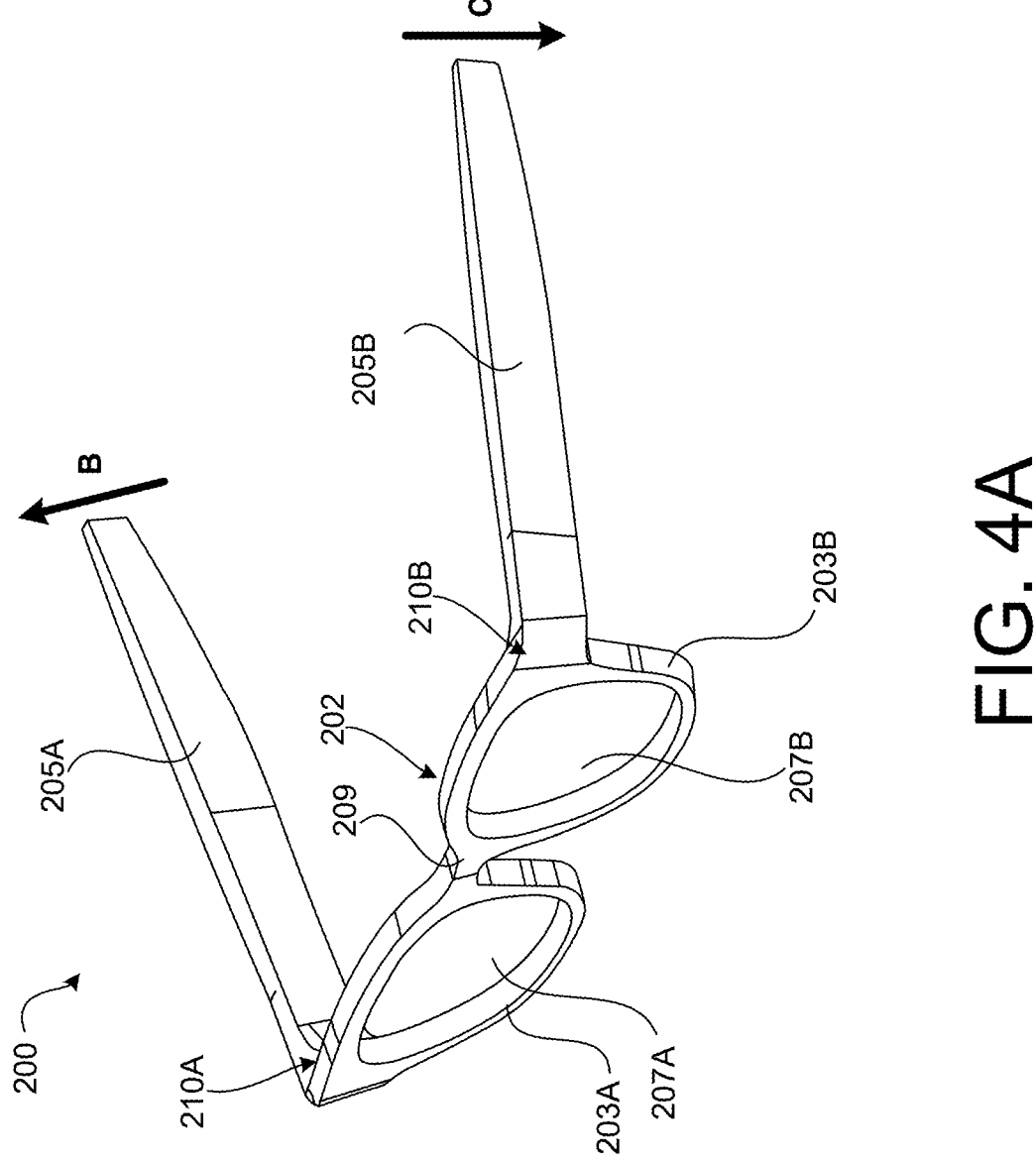
FIG. 4A is a schematic perspective view.
Figure 4B:
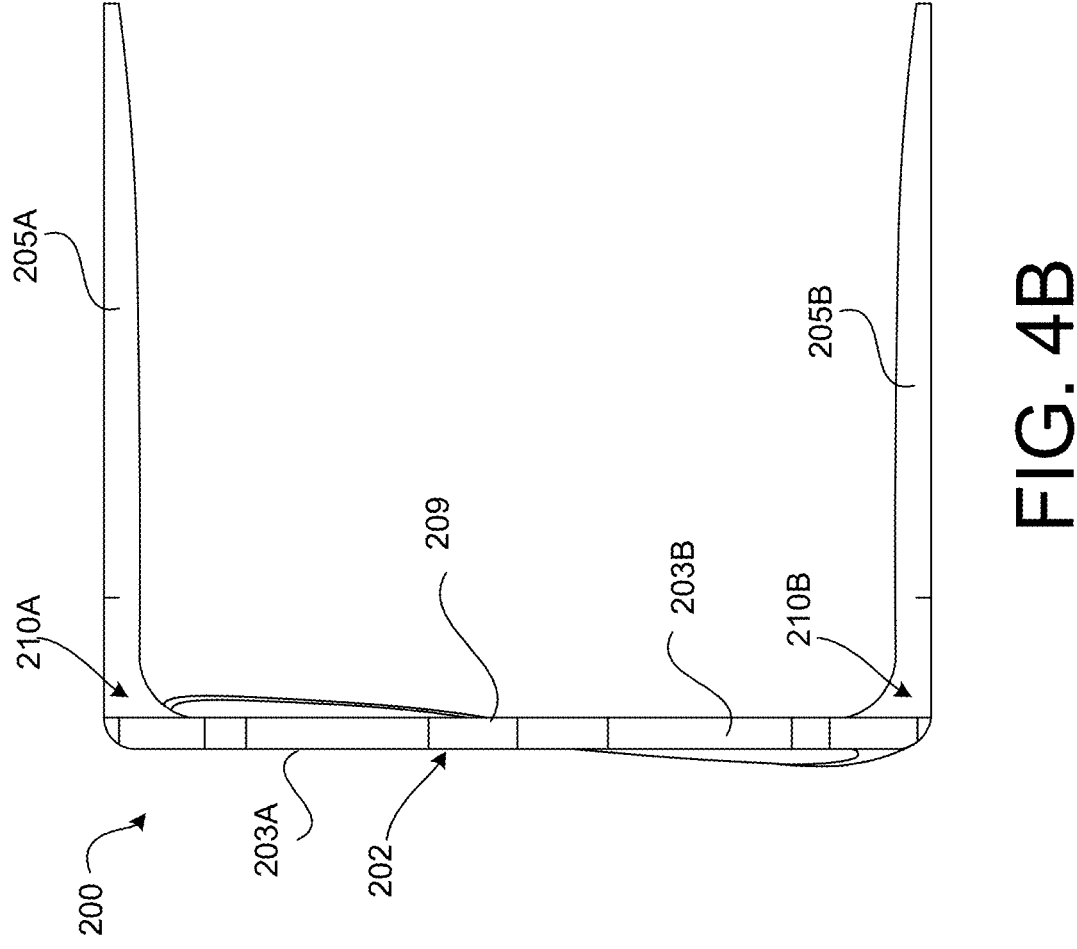
FIG. 4B is a schematic top view.
Figure 4C:
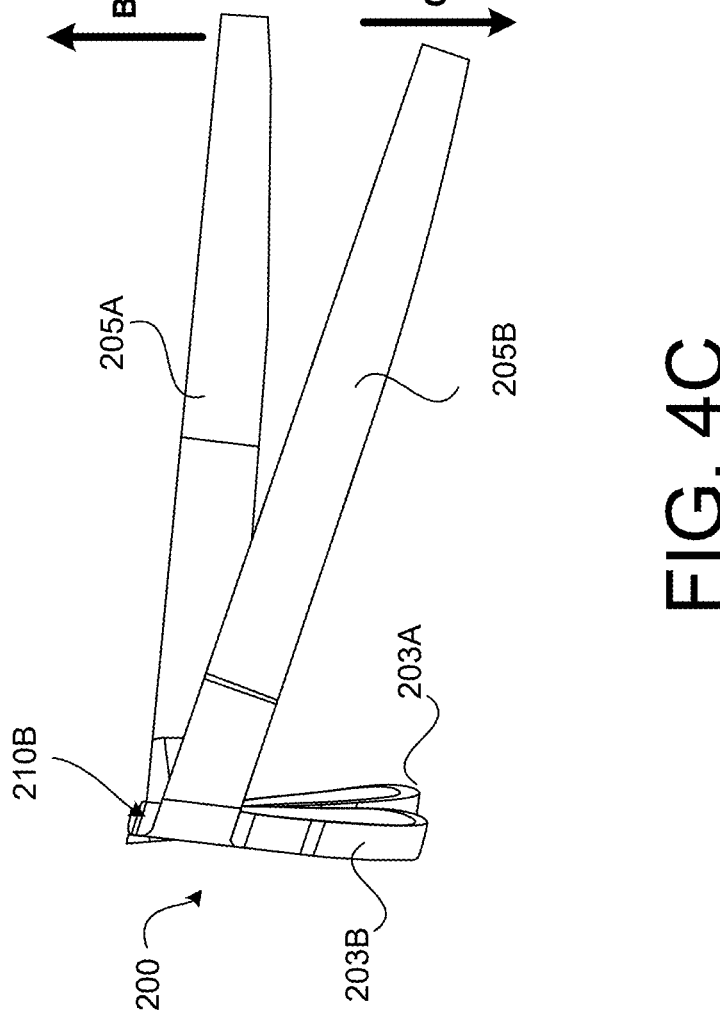
FIG. 4C is a schematic side view, of the sample head mounted wearable device shown in FIGS. 3A-3C, in a flexed state.

In FIG. 2, a sample frame 200 is mounted on the example system 290. FIGS. 3A-3C illustrate the sample frame 200 prior to being subjected to durability testing and validation by the example system 290. In particular, FIG. 3A is a perspective view, FIG. 3B is a top view, and FIG. 3C is a side view of the sample frame 200 in an at rest state, prior to testing and validation using the example system 290. FIGS. 4A-4C illustrate the sample frame 200 during durability testing by the example system 290. In particular, FIG. 4A is a perspective view, FIG. 4B is a top view, and FIG. 4C is a side view of the sample frame 200 is in a flexed, or deformed, state, during testing.

As shown in FIGS. 3A-4C, the sample frame 200 includes a first rim portion 203A and a second rim portion 203B connected by a bridge portion 209. A first lens 207A is coupled in the first rim portion 203A, and a second lens 207B is coupled in the second rim portion 203B. The first rim portion 203A, the second rim portion 203B, and the bridge portion 209 may define a front frame portion 202 of the sample frame 200. A first temple arm portion 205A is rotatably coupled to the front frame portion 202 (at the first rim portion 203A) by a first hinge portion 210A. A second temple arm portion 205B is rotatably coupled to the front frame portion 202 (at the second rim portion 203B) by a second hinge portion 210B.

During testing, the sample frame 200 may be subjected to various different types of motion. For example, in one mode of testing, the end portion of one or both of the temple arm portions 205A. 205B may be subjected to an arcuate motion, for example, in the direction of the arrow A shown in FIG. 2, for a set number of cycles. This arcuate motion may simulate, for example, the flexing, or spreading, of the temple arm portions 205A, 205B to accommodate a head width, an car/nose position, and the like, of a particular user, over time. In some examples, the arcuate motion may be a circular motion. In some examples, the arcuate motion may have set parameters defining, for example, an amount of horizontal displacement, an amount of vertical displacement, and the like of the end portions of the temple arm portions 205A, 205B. During the application of this arcuate motion, the temple arm portions 205A, 205B may be coupled to a support structure of the system 290 at an intermediate location along the length of the temple arm portions 205A, 205B, so that there is substantially no translation along the X-axis, substantially no rotation about the Y-axis, and limited rotation at the bridge portion 209 about the Z-axis. At completion of the set number of cycles, the sample frame 200 may be considered to have been validated if the sample frame 200 meets previously set criteria that are indicative of a desired level of reliability or durability of the sample frame 200 over time. In some examples, the set criteria may include, for example, that the sample frame 200 is free of fractures, that the sample frame 200 has not deformed by greater than a set amount from its original configuration, that the temple arm portions 205A, 205B can support the weight of the sample frame 200 in the open position, and other such criteria.

In the example shown in FIG. 2, the sample frame 200 is mounted on the system 290 so that the end portion of the first temple arm portion 205A of the sample frame 200 is subjected to the circular motion in the direction of the arrow A. Application of the circular motion as described above may cause flexure in the sample frame 200, from the essentially at rest configuration shown in FIGS. 3A-3C, to the configuration shown in FIGS. 4A-4C. In particular, as shown in FIGS. 4A and 4C, application of a force at the end of the first temple arm portion 205A and the resulting circular motion at the end of the first temple arm portion 205A has caused movement, or deflection, of the first temple arm portion 205A in the direction of the arrow B, and movement, or deflection, of the second temple arm portion 205B in the direction of the arrow C. Movement, or deflection, of the first and second temple arm portions 205A, 205B in response to the force and corresponding movement of the end of the first temple arm portion 205A as shown in FIG. 4A can produce some level of twist in the front frame portion 202, as shown in FIGS. 4B and 4C. In this particular example, this movement, or deflection, of the first and second temple arm portions 205A, 205B in response to this applied force has caused a rearward deflection of the first rim portion 203A and the first lens 207A, and a forward deflection of the second rim portion 203B and the second lens 207B. As the first temple arm portion 205A is cycled (i.e., through rotation of the end portion thereof as a force is applied in the direction of the arrow A), movement of the temple arm portions 205A, 205B will alternate in an up-down pattern until completion of the cycling. Similarly, in response to the cycling of the first temple arm portion 205A, deflection of the first and second rim portions 203A, 203B will alternate in a forward-rear deflection pattern and corresponding twisting of the front frame portion 202 until completion of the cycling.

Figure 5:
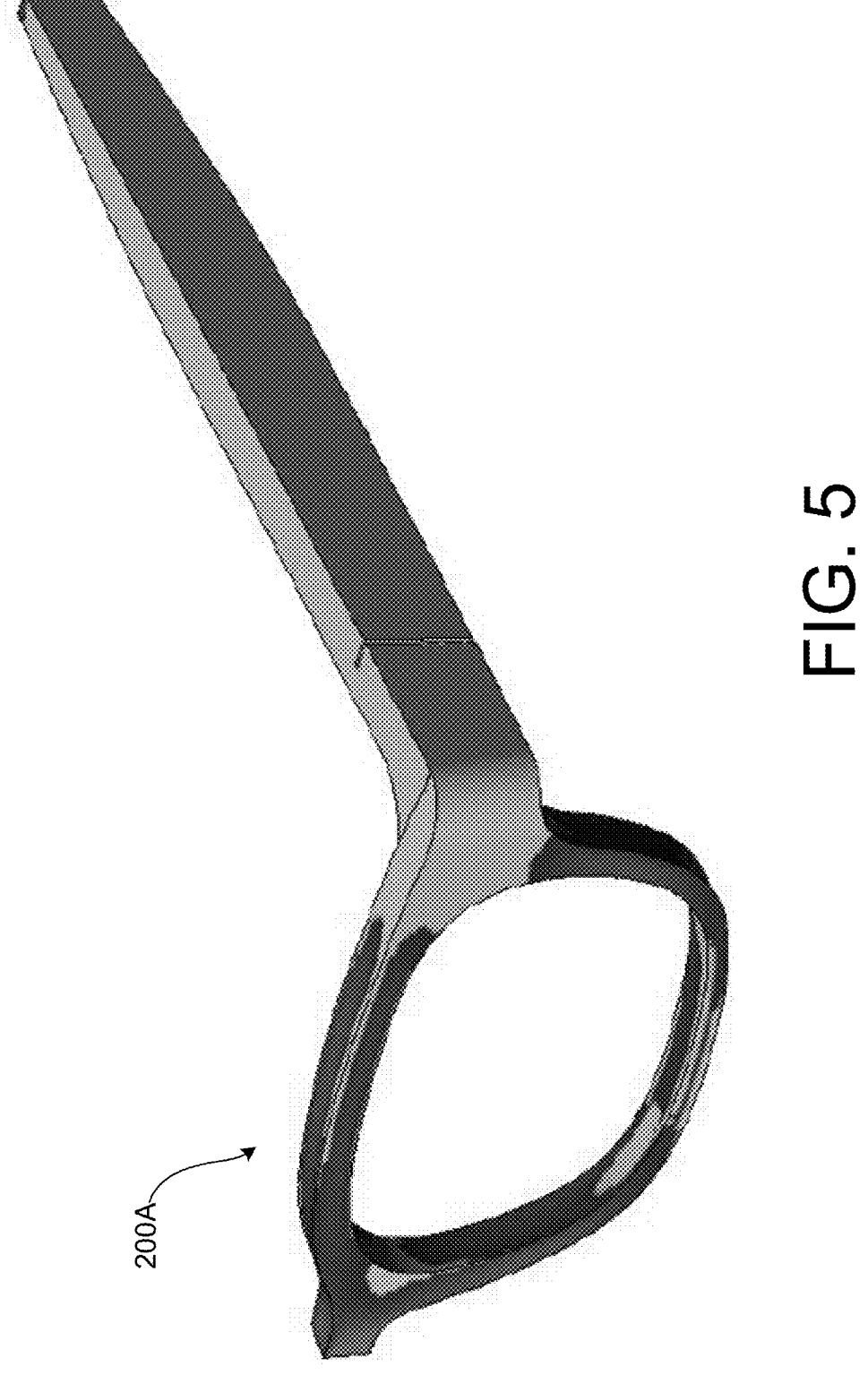
FIG. 5 illustrates a distribution of yield stress in a sample frame having a rigid front frame portion.

In traditional ophthalmic eyewear, the frame may be flexible enough so as to not exceed the yield strength of the frame material. In some examples, traditional ophthalmic eyewear includes spring hinges between the front frame portion and the temple arm portions to provide additional flexibility. This may allow these types of frames to meet or exceed the set testing criteria described above. However, in the head mounted wearable device 100 described above with respect to FIGS. 1A-1C (including display capability and processing/computing capability, and the various associated electronic components), deformation, even elastic deformation, at the front frame portion 102 (i.e., between the first and second rim portions 103 and the first and second lenses 107) is necessarily essentially zero to maintain display alignment. That is, even if the front frame portion 102 were to return to its original configuration after flexure, the time during which the front frame portion 102 is twisted, or flexed, will disrupt the output of the display device 104 and cause visual discomfort. While rigidity of the front frame portion 102 may address this issue, this additional rigidity of the front frame portion 102 will result in higher stresses applied to the front frame during the type of durability testing described above, and may result in a compromised, or broken frame 190. This type of result (i.e., compromised, or broken frame 190) will preclude the incorporation of traditional ophthalmic functionality into the head mounted wearable device 100 including display capability and processing/computing capability. FIG. 5 illustrates a sample frame 200A including a rigid front frame portion that has undergone the durability testing described above with respect to FIGS. 2-4C. In FIG. 5, the darkened areas of the rim portion indicate areas of the rim portion that have exceeded the yield strength of the material.

Figure 6A:
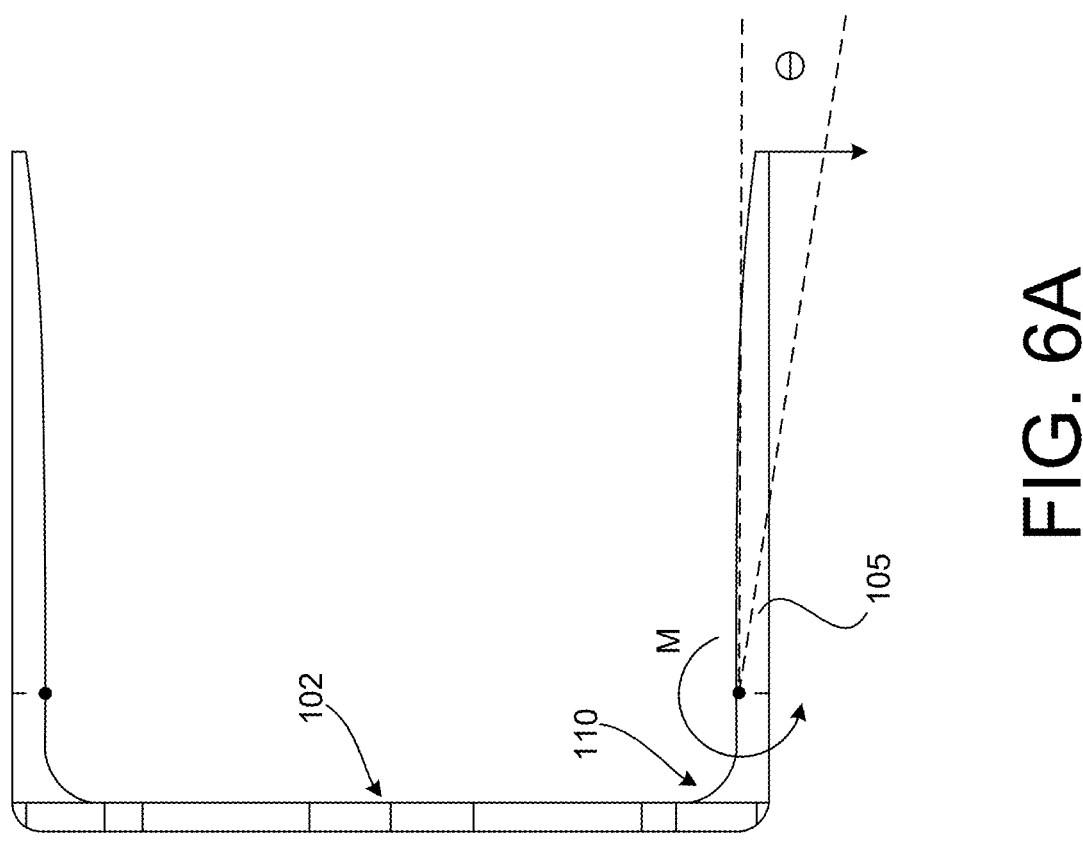
FIG. 6A is a top view of the sample frame shown in FIGS. 3A-4C, illustrating moment forces generated in response to deflection of a temple arm portion of the sample frame.
Figure 6B:
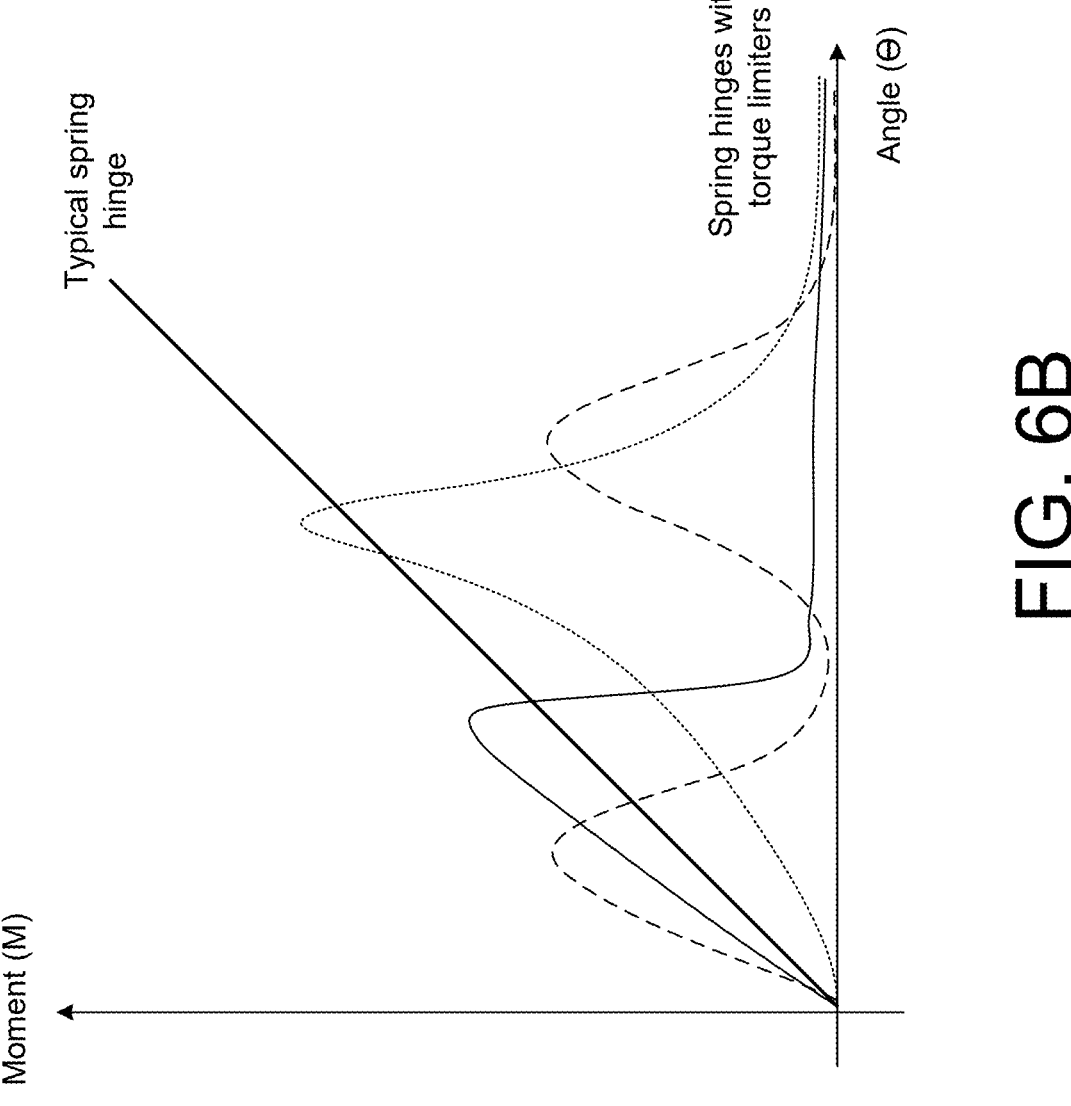
FIG. 6B is a graph of moment forces as a function of deflection angle of the temple arm portion of the sample frame.

Accordingly, a head mounted wearable device including display capability and/or computing processing capability may include a hinge mechanism having a torque control feature. This may provide for some amount of flexibility to accommodate the relatively small deflections that are typically accommodated in traditional ophthalmic eyewear by using a standard hinge (which provides compliance in one axis) and/or a flexible frame. A hinge mechanism including a torque control feature, in accordance with implementations described herein, may provide for compliance in multiple axes. This will decrease loads into the front frame portion generated by larger deflections, or allow those loads to dissipate to essentially zero. Thus, torque loads input at the temple arm portions are not transmitted to the front frame portion. Instead, these torque loads are absorbed at the hinge portion/hinge mechanism between the temple arm portion and the front frame portion. This is illustrated in the schematic diagram shown in FIG. 6A, and the graph shown in FIG. 6B. For a deflection of the temple arm portion 105 in the amount of an angle Θ, a moment M is generated at the corresponding hinge portion 110. When using a typical spring hinge to couple the temple arm portion 105 to the front frame portion 102, the moment M generated at the hinge portion 110 (and transmitted at least in part to the front frame portion 102) follows a substantially linear path as the deflection angle Θ increases, as shown in FIG. 6B. In contrast, a hinge mechanism including torque control features, in accordance with implementations described herein, may cause the moment M generated at the hinge portion 110 to dissipate, even as the deflection angle Θ increases.

In some examples, a hinge mechanism including one or more torque limiting features, or torque control features, may include magnetic components. In some examples, a hinge mechanism including one or more torque limiting features, or torque control features, may include elastomer components. In some examples, a hinge mechanism including one or more torque limiting features, or torque control features, may include friction components. In some examples, a hinge mechanism including one or more torque limiting features, or torque control features, may include biased, or spring loaded components. In some examples, a hinge mechanism including one or more torque limiting features, or torque control features, may include a reset feature that re-engages the one or more torque limiting features.

FIGS. 7A-7E illustrate an example hinge mechanism 700 including a torque limiting feature, or torque control feature, in accordance with implementations described herein. The example hinge mechanism 700 can be incorporated into a hinge portion of a frame of ophthalmic eyewear, including into the hinge portion 110 of the head mounted wearable device 100 including the display device 104 and other electronic components, as shown in FIGS. 1A-1C and described above. The example hinge mechanism 700 including one or more torque limiting features, or torque control features, may provide for compliance in multiple axes. In the hinge mechanism 700 providing for compliance in multiple axes, torque and/or moment forces generated at the hinge portion 110 of the frame 190 are not transmitted to the front frame portion 102 of the frame 190. In some examples, the torque limiting features and/or torque control features of the hinge mechanism act such that a portion of torque and/or moment forces that are transmitted to the front frame portion 102 do not exceed a level which will cause damage to the front frame portion 102 and/or misalignment of the content output by the display device(s) 104. The torque limiting feature(s), or torque control feature(s) of the example hinge mechanism 700 allow for the front frame portion 102 and the temple arm portions 105 of the head mounted wearable device 100 to be rigid enough to maintain display alignment, including binocular display alignment, and support the electronic components, while also dissipating the torque generated by the deflection of the temple arm portions 105 as described above with respect to FIGS. 3A-6B, to maintain functionality of the head mounted wearable device 100.

The example hinge mechanism 700 includes a magnetic torque control device 790. The hinge mechanism 700 includes a first wall 750 and a second wall 760, with the magnetic torque control device 790 positioned between the first wall 750 and the second wall 760. In the example shown in FIGS. 7A-7E, the magnetic torque control device 790 includes a first array of magnets 710 and a second array of magnets 720. In the example shown in FIGS. 7A-7E, the hinge mechanism 700 is substantially cylindrical, with the first wall 750 and the second wall 760 each having a substantially circular cross-sectional shape, and being concentrically arranged, simply for purposes of discussion and illustration. In this example arrangement, the first array of magnets 710 is arranged on an outer circumferential surface of the first wall 750. The second array of magnets 720 is arranged on an inner circumferential surface of the second wall 760, facing the first array of magnets 710. The magnets of the first array of magnets 710 and the magnets of the second array of magnets 720 are selectively engageable based on a relative rotational position of the first and second walls 750, 760 and a corresponding a relative position of the respective poles of the first and second arrays of magnets 710, 720.

Figure 7A:
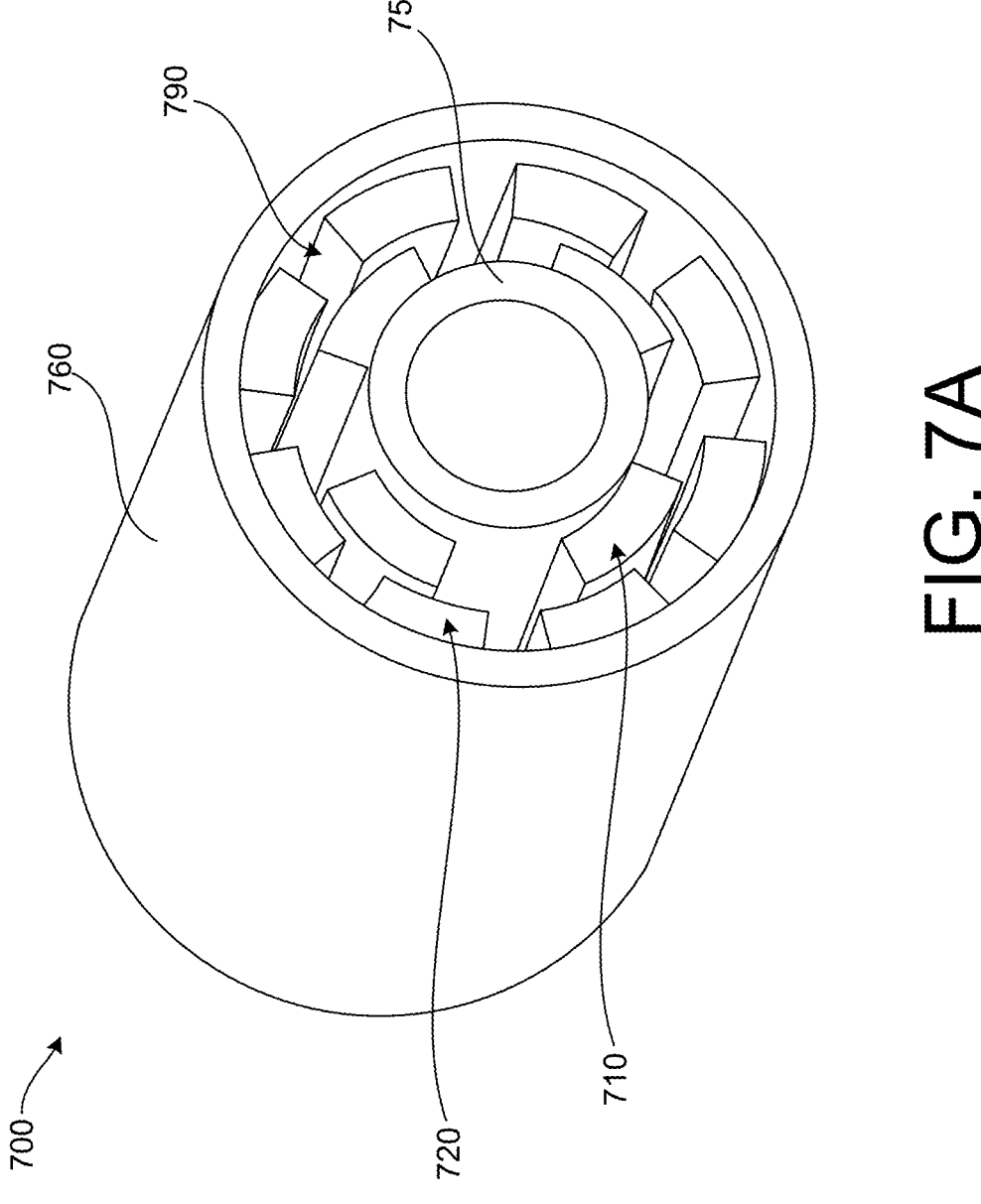
FIGS. 7A-7E illustrate an example hinge mechanism including an example torque control device, in accordance with implementations described herein.
Figure 7B:
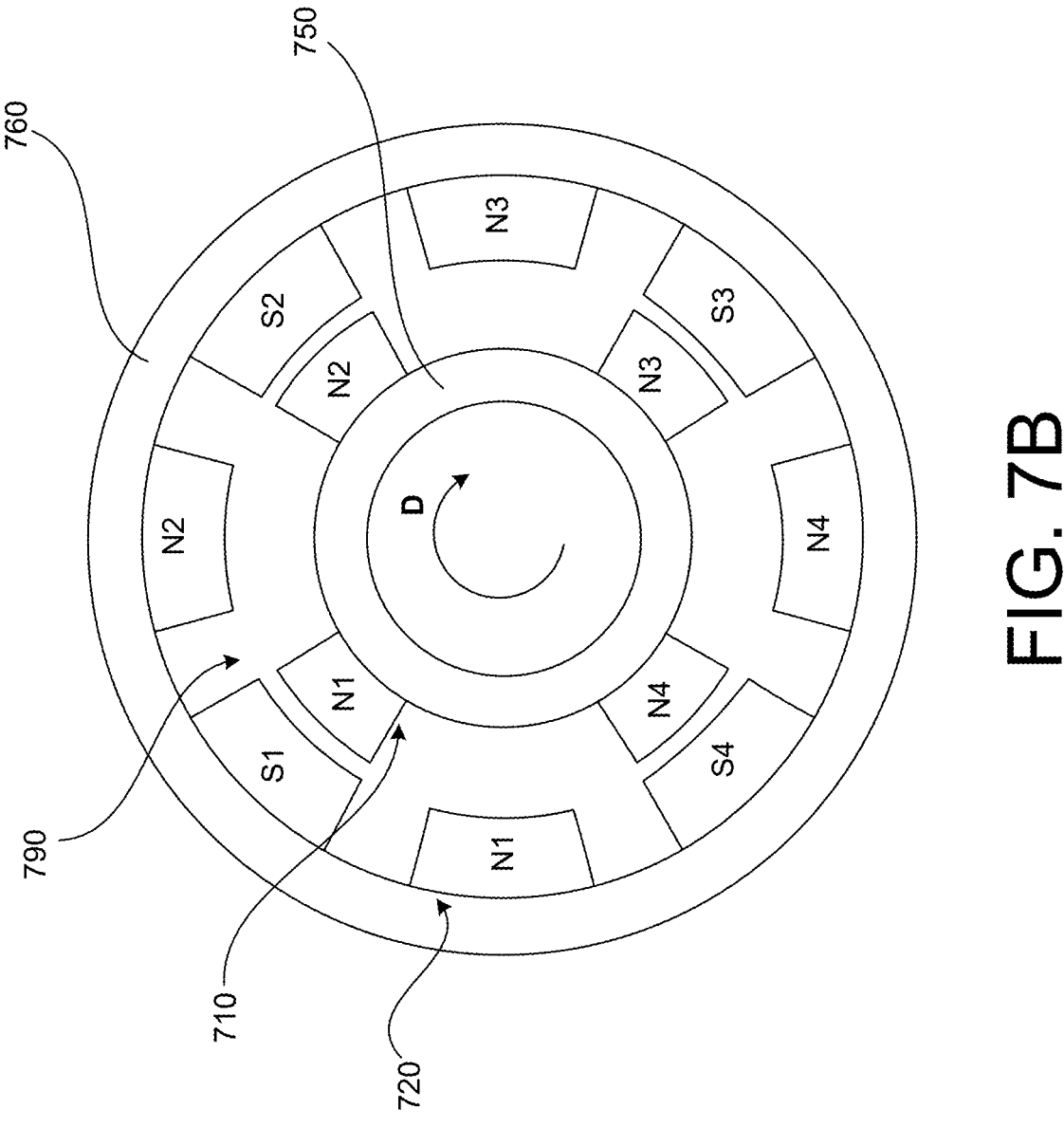
Figure 7C:
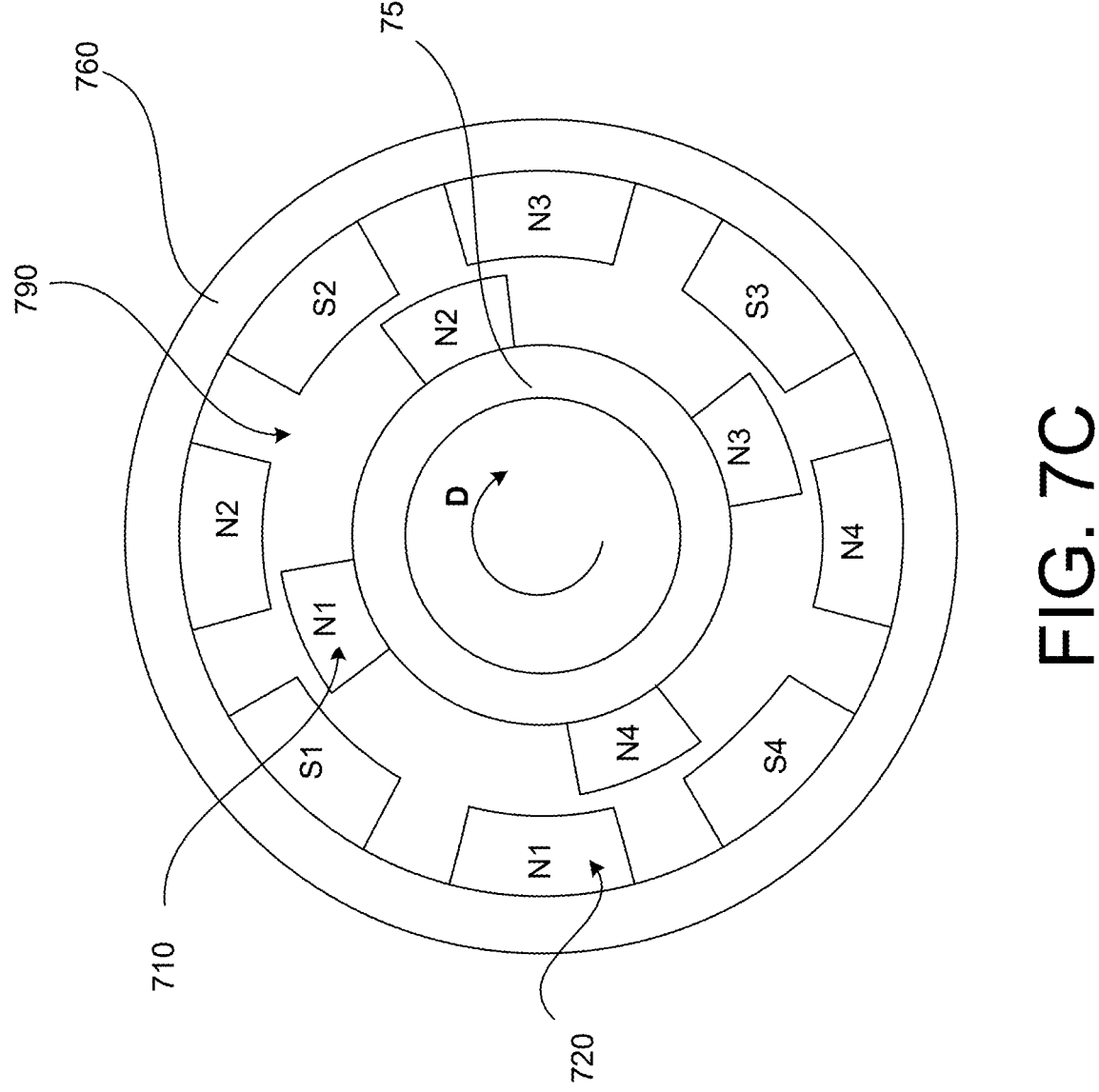
Figure 7D:
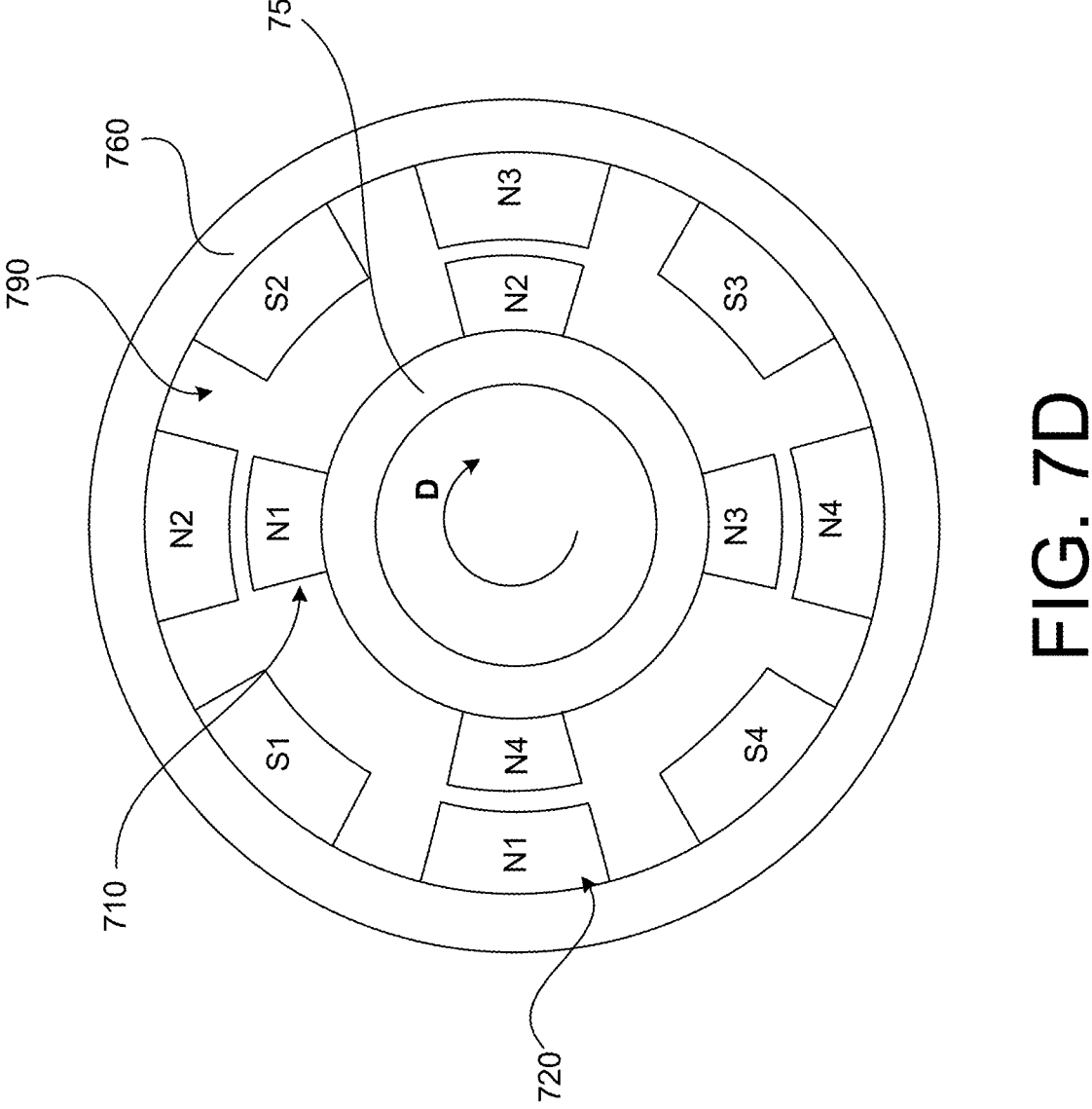
Figure 7E:
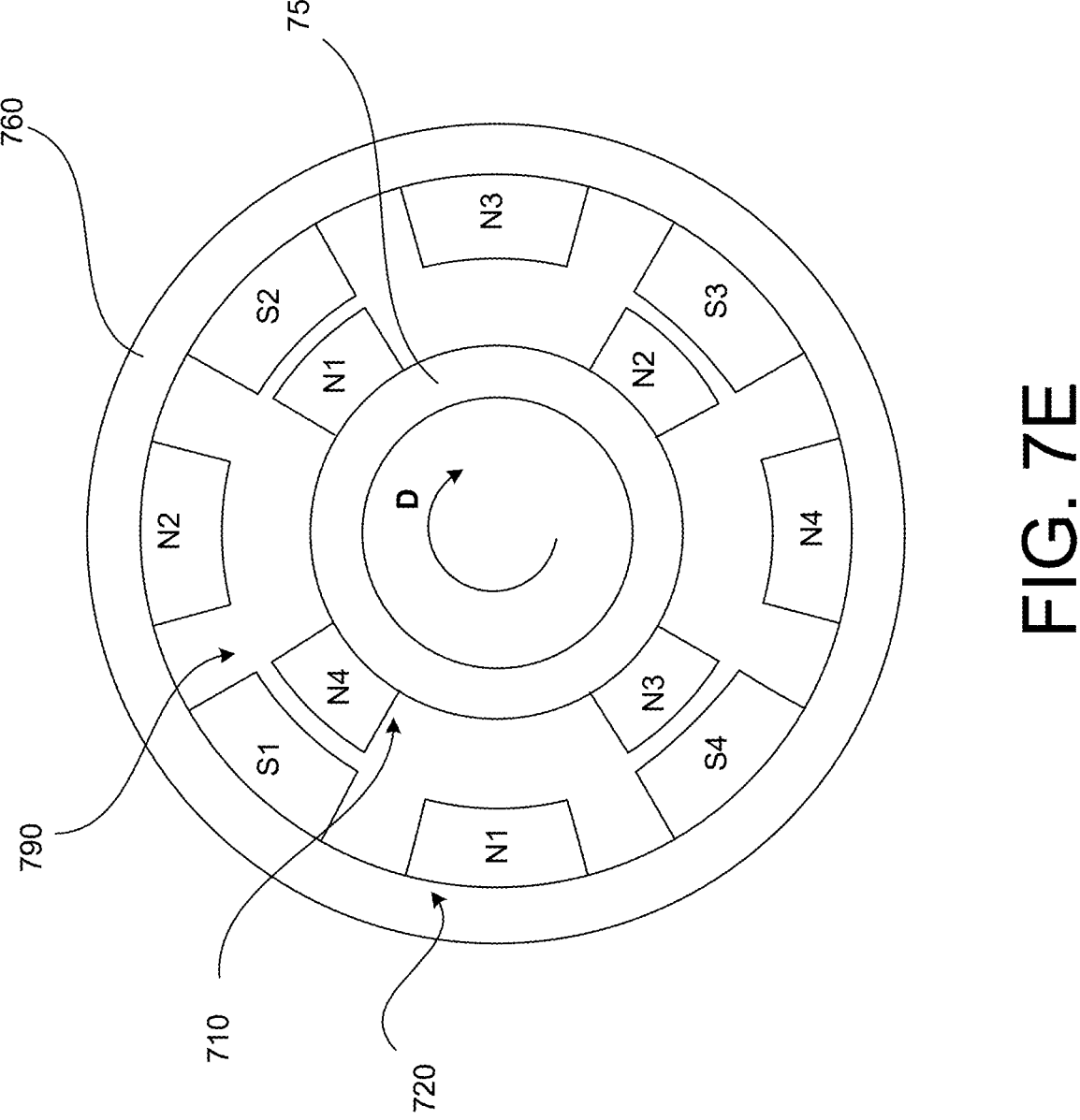

In FIG. 7B, the magnetic torque control device 790 is in a state of equilibrium, in which the poles of the first array of magnets 710 align with the poles of the second array of magnets 720. In the state of equilibrium, the frame 190 may be experiencing little to no deflection at the temple arm portion 105. In the state of equilibrium, little to no torque and/or moment forces are generated at the hinge portion 110/hinge mechanism 700. In FIGS. 7C and 7D, some amount of deflection has been applied at the temple arm portion 105/hinge portion 110 of the frame 190, generating torque at the hinge mechanism 700. In the states shown in FIGS. 7C and 7D, the first wall 750 has rotated in the direction of the arrow D relative to the second wall 760, causing a corresponding rotation of the first array of magnets 710 arranged on the first wall 750 relative to the second array of magnets 720 arranged on the second wall 760. Thus, in FIGS. 7C and 7D, the hinge mechanism 700/torque control device 790 has moved away from the state of equilibrium shown in FIG. 7B in response to rotation of the first wall 750/first array of magnets 710 (i.e., deflection at the temple arm portion 105 relative to the front frame portion 102). Continued rotation of the first wall 750/first array of magnets 710 in the direction of the arrow D, through the intermediate states shown in FIGS. 7C and 7D to the state shown in FIG. 7E, causes the magnets of the first array of magnets 710 to again be aligned with the magnets of the second array of magnets 720, to return to a state of equilibrium, as shown in FIG. 7E. That is, based on the relative arrangement of the first and second arrays of magnets 710, 720, relative magnet strengths, and other such considerations, the hinge mechanism 700/torque control device 790 will overcome the engagement of the first and second arrays of magnets 710, 720 and return to the state of equilibrium in response to continued rotation that represents a torque level that is greater than or equal to a set threshold torque level.

In the example shown in FIGS. 7A-7E, rotation of the first wall 750 (and corresponding rotation of the first array of magnets 710) produces a repeating pattern of increasing torque followed by a rapid decrease in torque. For example, rotation of the first wall 750 (and corresponding rotation of the first array of magnets 710) may produce a sawtooth torque profile as the hinge mechanism 700/torque control device 790 moves away from the state of equilibrium shown in FIG. 7B, through the intermediate states shown in FIGS. 7C and 7D as the first wall 750/first array of magnets 710 is rotated, and to the state of equilibrium shown in FIG. 7E. In some examples, the torque control device 790 may be reset to an initial position (for example, the state of equilibrium shown in FIG. 7B) by closing the temple arm portions 105 against the front frame portion 102. That is, the closing of the closing of the temple arm portions 105 against the front frame portion 102 may cause a reverse rotation of the first wall 750 relative to the second wall 760 (i.e., a rotation of the first wall 750 in the opposite direction of the arrow D), thus returning the components of the torque control device 790 to the initial position shown in FIG. 7B.

The example first array of magnets 710 and second array of magnets 720 as shown in FIGS. 7A-7E are presented for illustrative purposes. The principles described herein can be applied to numerous variations in the arrangements of magnets included in various implementations of the magnetic torque control device 790. For example, the magnetic torque control device 790 can include various different magnet polarizations and/or combinations of polarizations and/or arrangements of polarizations. The magnetic torque control device 790 can include various different magnet spacings amongst the magnets of the first and/or second arrays of magnets 710, 720 and/or distance between the magnets of the first array of magnets 710 and the second array of magnets 720. The magnetic torque control device 790 can include various different magnet strengths. These features of the magnetic torque control device 790 can be varied to in turn adjust the torque-angular deflection relationship for a particular application.

Figure 8A:
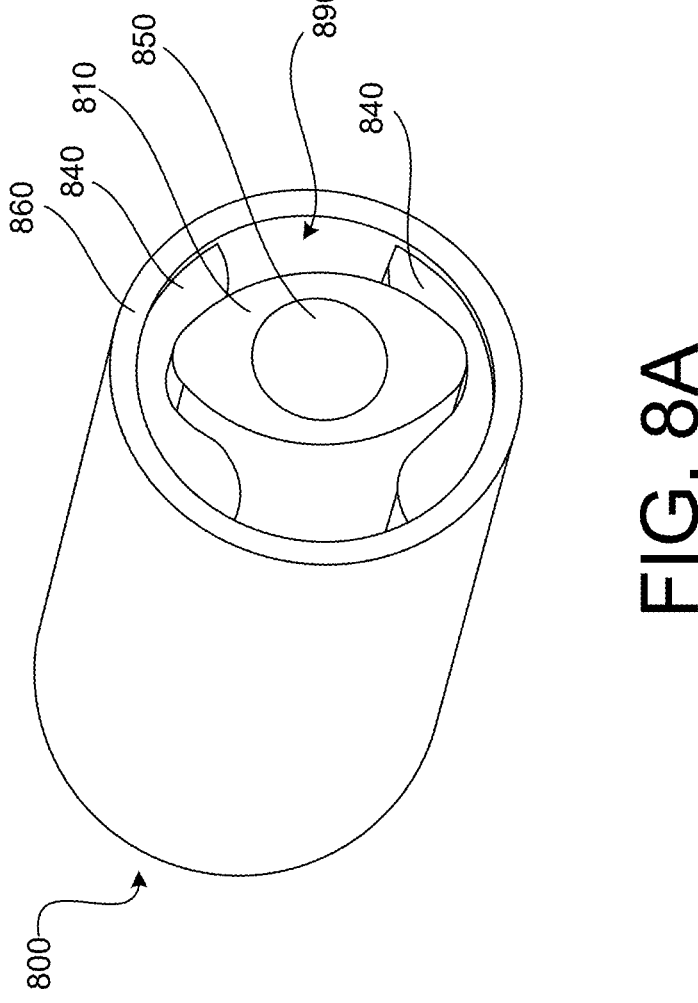
FIGS. 8A-8C illustrate an example hinge mechanism including an example torque control device, in accordance with implementations described herein.
Figure 8B:
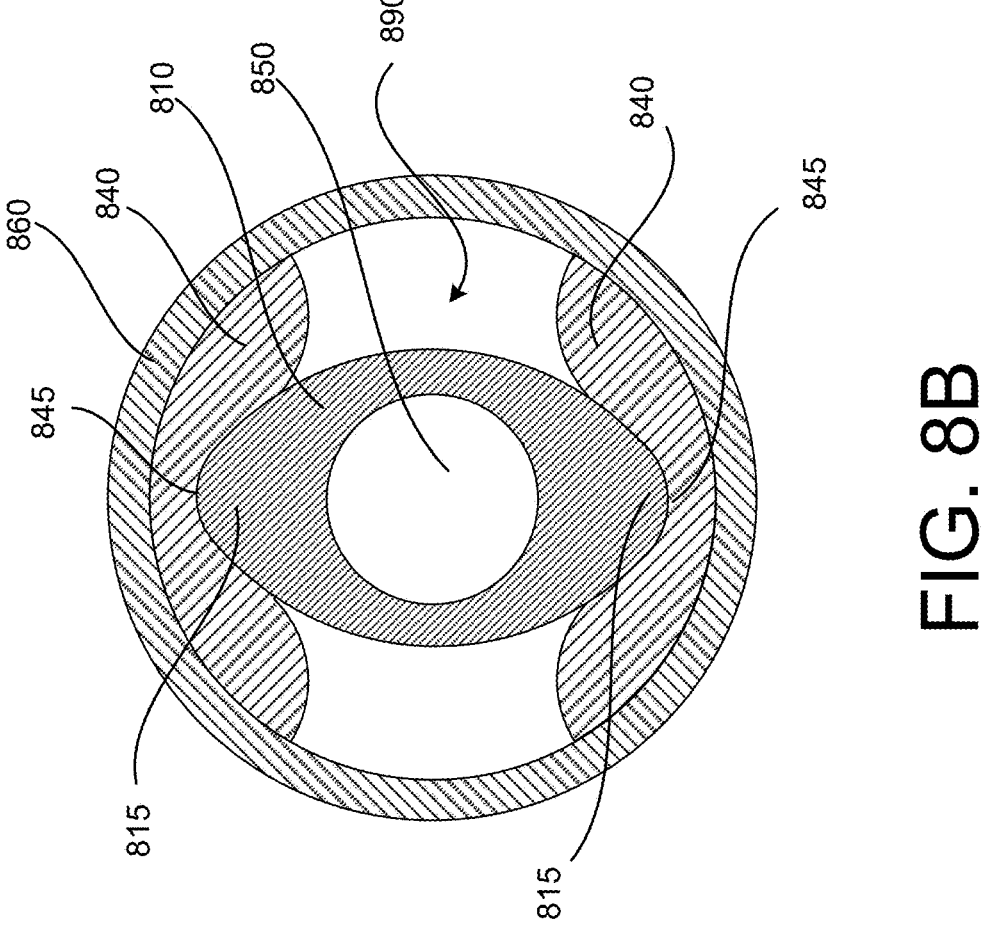
Figure 8C:
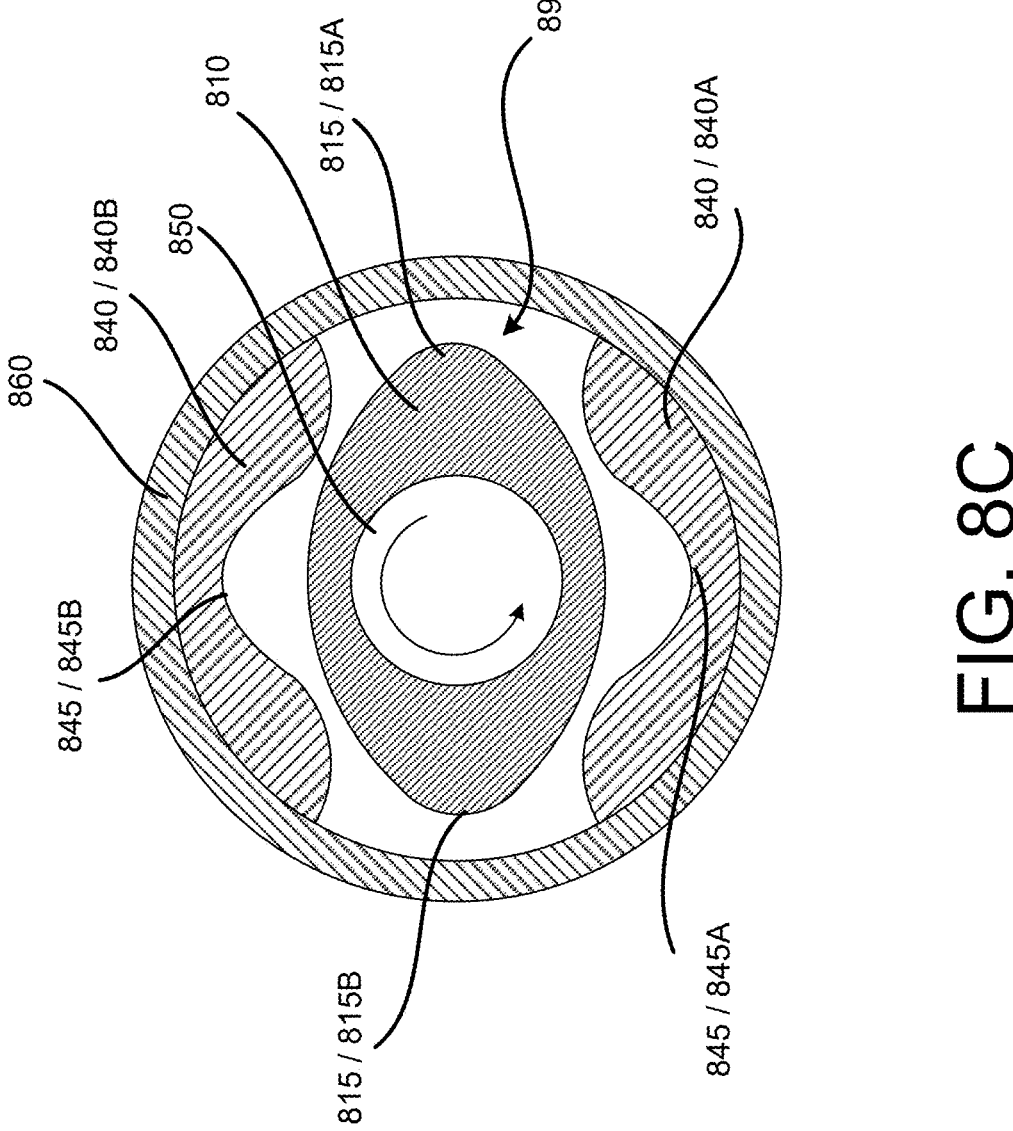

FIGS. 8A-8C illustrate an example hinge mechanism 800 including a torque limiting feature, or torque control feature, in accordance with implementations described herein. The example hinge mechanism 800 can be incorporated into a hinge portion of a frame of ophthalmic eyewear, including into the hinge portion 110 of the head mounted wearable device 100 including display capability and/or computing/processing capability, and the associated electronic components, as shown in FIGS. 1A-1C and described above. The example hinge mechanism 800 including one or more torque limiting features, or torque control features, may allow for compliance in multiple axes. In the hinge mechanism 800 providing for compliance in multiple axes, torque and/or moment forces generated at the hinge portion 110 of the frame 190 are not transmitted to the front frame portion 102 of the frame 190. In some examples, the torque limiting features and/or torque control features of the hinge mechanism act such that a magnitude of torque and/or moment forces that are transmitted to the front frame portion 102 do not exceed a level which will cause damage to the front frame portion 102 and/or misalignment of the content output by the display device(s) 104. The torque limiting feature(s), or torque control feature(s) of the example hinge mechanism 800 allow for the front frame portion 102 and the temple arm portions 105 of the head mounted wearable device 100 to be rigid enough to maintain display alignment, including binocular display alignment, and support the electronic components, while also dissipating the torque generated by the deflection of the temple arm portions 105 as described above with respect to FIGS. 3A-6B to maintain functionality of the head mounted wearable device 100.

The example hinge mechanism 800 shown in FIGS. 8A-8C includes an elastomer torque control device 890. The hinge mechanism 800 includes an outer wall 860 concentrically arranged with a central pin 850. The elastomer torque control device 890 includes an engagement pin 810 that selectively engages an elastomer layer 840 arranged on an inner surface of the outer wall 860. In the example shown in FIGS. 8A-8C, the engagement pin 810 is coupled to and surrounds the central pin 850. In some examples, the central pin 850 and the engagement pin 810 may be integrally formed as a single unit. In some examples, the central pin 850 and the engagement pin 810 may be coupled so as to rotate together. In the example shown in FIGS. 8A-8C, the engagement pin 810 has a substantially ovoid shape so that end portions 815 of the ovoid shaped engagement pin 810 are selectively engageable recesses 845 formed in the elastomer layer 840 as the engagement pin 810 rotates.

In FIG. 8B, each of the two end portions 815 of the engagement pin 810 are received in a respective recess 845 formed in the elastomer layer 840. The central pin 850/engagement pin 810 may rotate in the direction of the arrow E, for example, in response to deflection at the temple arm portion 105 of the frame 190 in which the hinge mechanism 800 is installed, and torque is generated in the hinge mechanism 800. With the end portions 815 of the engagement pin 810 engaged in the recesses 845 of the elastomer layer 840, rotation of the engagement pin 810 applies and/or changes a load on the elastomer layer 840 to develop shear and/or compression in the elastomer layer 840 and the resulting torque. Continued rotation in the direction of the arrow E and continued/increased application of load will eventually cause the end portions 815 of the engagement pin 810 to be released from the recesses 845 in the elastomer layer 840, as shown in FIG. 8C. That is, based on the configuration, material properties and the like of the elastomer layer 840, and the configuration of the engagement pin 810, the end portions 815 will be released from, or disengaged from, the recesses 845 in response to continued rotation that represents a torque level that is greater than or equal to a set threshold torque level. In the example arrangement shown in FIG. 8C, in which the end portions 815 are disengaged from the recesses 845, there is essentially no contact between the engagement pin 810 and the elastomer layer 840, and thus no torque is transmitted.

That is, in the example shown in FIGS. 8A-8C, the elastomer layer 840 includes a first section 840A including a first recess 845A and a second section 840B including a second recess 845B. As the engagement pin 810 rotates in the direction of the arrow E, a first end portion 815A of the engagement pin 810 is released from the first recess 845A of the first section 840A of the elastomer layer 840, and is positioned in a gap area formed between the first section 840A and the second section 840B of the elastomer layer 840. Similarly, in response to rotation of the engagement pin 810 in the direction of the arrow E, a second end portion 815B of the engagement pin 810 is released from the second recess 845B of the second section 840B of the elastomer layer 840, and is positioned in a gap area formed between the first section 840A and the second section 840B of the elastomer layer 840. In this state, there is essentially no contact between the engagement pin 810 and the elastomer layer 840, and thus little to no torque is transmitted to the front frame portion 102.

In the example hinge mechanism 800 shown in FIGS. 8A-8C, the outer wall 860 is substantially cylindrical, and the engagement pin 810 is substantially ovoid, with two recesses 845 formed in the elastomer layer 840, simply for purposes of discussion and illustration. In some examples, the geometry of the engagement pin 810 and/or the geometry of the elastomer layer may be different than shown in FIGS. 8A-8C. Varying the geometry of the engagement pin

810 and/or the geometry of the elastomer layer 840 may produce a varying torque-angle response. For example, in some implementations, the elastomer layer 840 may include more, or fewer recesses 845. For example, increasing a number of recesses 845 provided in the elastomer layer 840 may provide for a finer, or more precise level of torque control. Similarly, in some examples, the elastomer layer 840 and/or the recesses 845 may be arranged asymmetrically, or symmetrically, to vary the torque-angle response for a particular application. Similarly, in some examples, different material properties of the elastomer layer 840 (such as, for example, varying durometers of elastomer material and the like) may produce different torque-angle responses.

In some examples, the torque control device 890 may be reset to an initial position (for example, the state shown in FIG. 8B) by closing the temple arm portions 105 against the front frame portion 102. That is, the closing of the closing of the temple arm portions 105 against the front frame portion 102 may cause a reverse rotation of the engagement pin 810 relative to the outer wall 860, thus returning the components of the torque control device 890 to the initial position.

The example hinge mechanisms described above include example torque control features, or torque limiting features, to provide compliance at the rotatable coupling between the temple arm portions and the front frame portions of a frame of a head mounted wearable device, and in particular a head mounted wearable device in the form of smart glasses. It is noted that, in the above examples, the example torque control features are illustrated acting along a single axis of rotation, simply for ease of discussion and illustration. However, the principles described herein can be applied to provide for torque control and compliance in multiple axes, as in the case of, for example, a two dimensional hinge application.

In some examples, hinge mechanisms in accordance with implementations described herein can include other types of torque limiting features, or torque control features not previously described in detail. For example, in some implementations, a ball-detent arrangement, in which a spring loaded ball coupled in one of a central pin or an outer wall of a hinge mechanism is configured to selectively engage one or more detents formed in the other of the central pin or the outer wall of the hinge mechanism to provide the desired torque control as the central pin rotates relative to the outer wall. In some implementations, a pawl spring-notched wheel arrangement, in which a spring loaded pawl selectively engages a notched wheel of the hinge mechanism may provide the desired torque control.

The example implementations described above illustrate various different hinge mechanisms including torque limiting features, or torque control features, in accordance with implementations described herein, which may provide for rotatable coupling of a rim portion 103/front frame portion 102 and a temple arm portion 105 of a frame 190 of a head mounted wearable device 100 including display capability and/or processing/computing capability. The principles described above can be similarly applied to the rotatable coupling of the rim portion/front frame portion and the temple arm portions of other types of ophthalmic eyewear.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including." when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled." "connected," or "responsive" to, or "on," another element, it can be directly coupled, connected, or responsive to, or on, the other element, or intervening elements may also be present. In contrast, when an element is referred to as being "directly coupled." "directly connected," or "directly responsive" to, or "directly on," another element, there are no intervening elements present. As used herein the term "and/or" includes any and all combinations of one or more of the associated listed items.

Spatially relative terms, such as "beneath," "below." "lower." "above," "upper." and the like, may be used herein for case of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A head mounted wearable device, comprising:
a frame, including:
    a front frame portion;
    an arm portion coupled to the front frame portion; and
    a hinge mechanism rotatably coupling the arm portion to the front frame portion,
    wherein the hinge mechanism includes a torque control device that is configured to control a level of torque transmitted to the front frame portion in response to a force applied to the arm portion or a deflection of the arm portion, wherein the torque control device includes a first plurality of magnets distributed around at least one half of a perimeter of a first wall and a second plurality of magnets distributed around at least one half of a perimeter of a second wall surrounding the first wall.

2. The head mounted wearable device of claim 1, wherein the torque control device is positioned in a space formed between the first wall and the second wall of the hinge mechanism, and is configured to be selectively engaged in response to relative rotation of the first wall and the second wall of the hinge mechanism.

3. The head mounted wearable device of claim 2, wherein the first plurality of magnets and the second plurality of magnets are configured to be selectively engaged and disengaged in response to rotation of the first wall relative to the second wall.

4. The head mounted wearable device of claim 2, wherein the first plurality of magnets and the second plurality of magnets are configured to be disengaged in response to rotation of the first wall relative to the second wall that produces a torque level that is greater than a threshold torque level.

5. The head mounted wearable device of claim 2, wherein the second wall surrounds the first wall, and the first wall and the second wall are concentrically arranged.

6. The head mounted wearable device of claim 5, wherein the first plurality of magnets is arranged on an outer surface of the first wall, and the second plurality of magnets is arranged on an inner surface of the second wall.

7. The head mounted wearable device of claim 2, wherein first plurality of magnets are arranged on an outer surface of the first wall, the first plurality of magnets having a first polarity; and
the second plurality of magnets are arranged on an inner surface of the second wall, some of the second plurality of magnets having the first polarity, and some of the second plurality of magnets having a second polarity.

8. The head mounted wearable device of claim 7, wherein the second plurality of magnets are arranged on the inner surface of the second wall, alternating between the first polarity and the second polarity.

9. The head mounted wearable device of claim 2, wherein the first plurality of magnets and the second plurality of magnets are configured to be engaged in an at rest state of the hinge mechanism, and to be disengaged in response to rotation of the first wall relative to the second wall that produces a torque level at the hinge mechanism that is greater than a threshold torque level.

10. The head mounted wearable device of claim 1, wherein the torque control device is positioned in a space formed between a first wall and a second wall of the hinge mechanism and is configured to be selectively engaged in response to relative rotation of the first wall and the second wall of the hinge mechanism.

11. The head mounted wearable device of claim 1, wherein a number of the first plurality of magnets is different than a number of the second plurality of magnets.

12. The head mounted wearable device of claim 1, wherein ones of the first plurality of magnets or ones of the second plurality of magnets align with open spaces on the opposing first wall or second wall between adjacent ones of the first plurality of magnets or second plurality of magnets.

13. The head mounted wearable device of claim 1, wherein the first plurality of magnets and the second plurality of magnets attract when the first wall and the second wall are in at least two different relative rotational positions.

14. The head mounted wearable device of claim 13, wherein the first plurality of magnets and the second plurality of magnets repel when the first wall and the second wall are in at least two different relative rotational positions.

15. A hinge mechanism including a torque control device, comprising:
a first wall;
a second wall surrounding the first wall and concentrically arranged with the first wall;
a first array of magnets arranged around at least one half of a perimeter of an outer surface of the first wall; and
a second array of magnets arranged around at least one half of a perimeter of an inner surface of the second wall, facing the first array of magnets, at least one of the first array of magnets and the second array of magnets being arranged with alternating polarity.

16. The hinge mechanism including a torque control device of claim 15, wherein
the first array of magnets includes a first plurality of magnets having a first polarity; and
the second array of magnets includes a second plurality of magnets, some of the second plurality of magnets having the first polarity, and some of the second plurality of magnets having a second polarity, wherein the second plurality of magnets are arranged on the inner surface of the second wall, alternating between the first polarity and the second polarity.

17. The hinge mechanism including a torque control device of claim 15, wherein the first array of magnets and the second array of magnets attract when the first wall and the second wall are in at least two different relative rotational positions.

18. The hinge mechanism including a torque control device of claim 17, wherein the first array of magnets and the second array of magnets repel when the first wall and the second wall are in at least two different relative rotational positions.

* * * * *